(12) United States Patent
Speidel et al.

(10) Patent No.: US 12,445,928 B2
(45) Date of Patent: Oct. 14, 2025

(54) ORBITAL OR OTHER NON-TERRESTRIAL BASE STATION PREEMPTION AND/OR REPLACEMENT UPON TERRESTRIAL BASE STATION INCAPACITY OR FAILURE

(71) Applicant: Lynk Global, Inc., Falls Church, VA (US)

(72) Inventors: Tyghe Robert Speidel, Washington, DC (US); Mahmoud Khafagy, Fairfax, VA (US); Stephen A. Wilkus, Middletown, NJ (US)

(73) Assignee: Lynk Global, Inc., Falls Church, VA (US)

( * ) Notice: Subject to any disclaimer, the term of this patent is extended or adjusted under 35 U.S.C. 154(b) by 317 days.

(21) Appl. No.: 18/304,221

(22) Filed: Apr. 20, 2023

(65) Prior Publication Data

US 2023/0345341 A1 Oct. 26, 2023

Related U.S. Application Data

(60) Provisional application No. 63/363,479, filed on Apr. 22, 2022.

(51) Int. Cl.
*H04W 36/30* (2009.01)
*H04W 84/06* (2009.01)

(52) U.S. Cl.
CPC .......... *H04W 36/305* (2018.08); *H04W 84/06* (2013.01)

(58) Field of Classification Search
CPC .... H04W 36/305; H04W 84/06; H04W 24/04
See application file for complete search history.

(56) References Cited

U.S. PATENT DOCUMENTS

| 6,043,776 A | 3/2000 | Chiba et al. |
| 6,112,054 A | 8/2000 | Kita |
| 6,278,861 B1 | 8/2001 | Ward et al. |

(Continued)

FOREIGN PATENT DOCUMENTS

| CN | 1185252 A | 6/1998 |
| CN | 108476057 A | 8/2018 |

(Continued)

OTHER PUBLICATIONS

International Search Report dated Feb. 4, 2020 issued in PCT Application No. PCT/US2019/050030, pp. 1-5.

(Continued)

*Primary Examiner* — Hashim S Bhatti
(74) *Attorney, Agent, or Firm* — Haynes and Boone, LLP

(57) ABSTRACT

A method is disclosed for providing backup network services in a communications network used by mobile terminals such as cellular telephones. The method includes receiving information regarding a terrestrial base station of the communications network and, using a non-terrestrial base station (NTBS) such as an orbiting satellite, detecting an incapacity of the terrestrial base station. The NTBS identifies a second NTBS (e.g., a second satellite) within communications range to provide backup service to the communications network. The second NTBS is then introduced as a new base station of the communications network. The second NTBS can then substitute for the incapacitated terrestrial base station to carry traffic between at least one mobile terminal and the communications network.

21 Claims, 15 Drawing Sheets

(56) References Cited

U.S. PATENT DOCUMENTS

| | | |
|---|---|---|
| 8,914,536 B2 | 12/2014 | Beeler et al. |
| 9,651,946 B1 | 5/2017 | Rubel et al. |
| 9,888,426 B2 | 2/2018 | Ulupinar et al. |
| 2002/0097690 A1 | 7/2002 | Fleeter et al. |
| 2004/0090935 A1 | 5/2004 | Courtney |
| 2009/0098850 A1 | 4/2009 | Deaton et al. |
| 2010/0039967 A1 | 2/2010 | Karabinis et al. |
| 2010/0117901 A1 | 5/2010 | Uchida |
| 2011/0086638 A1 | 4/2011 | Medapalli |
| 2012/0177085 A1 | 7/2012 | Fleeter et al. |
| 2012/0178363 A1 | 7/2012 | Moore, III |
| 2014/0087683 A1 | 3/2014 | Lim et al. |
| 2014/0141784 A1 | 5/2014 | Schmidt et al. |
| 2016/0132773 A1 | 5/2016 | Chandrasekaran et al. |
| 2016/0192235 A1 | 6/2016 | Ahluwalia et al. |
| 2016/0204866 A1 | 7/2016 | Boroson et al. |
| 2017/0127409 A1 | 5/2017 | Mishra et al. |
| 2017/0215121 A1 | 7/2017 | Condeixa et al. |
| 2017/0374596 A1* | 12/2017 | Benammar ........ H04B 7/18517 |
| 2018/0160427 A1 | 6/2018 | Ravishankar et al. |
| 2018/0183511 A1* | 6/2018 | Oga ..................... H04B 7/208 |
| 2019/0181946 A1 | 6/2019 | Wendling |
| 2020/0053693 A1 | 2/2020 | Lopes et al. |
| 2022/0030495 A1 | 1/2022 | Qiao et al. |
| 2022/0052753 A1* | 2/2022 | Speidel ................. H04W 16/10 |

FOREIGN PATENT DOCUMENTS

| | | |
|---|---|---|
| JP | H11-502985 A | 3/1999 |
| JP | 2003526959 A | 9/2003 |
| JP | 2013526227 A | 6/2013 |
| JP | 2017168898 A | 9/2017 |
| WO | 2012/177343 A1 | 12/2012 |
| WO | 2017/068201 A1 | 4/2017 |
| WO | 2017/177343 A1 | 10/2017 |
| WO | 2017189862 A1 | 11/2017 |
| WO | 2018/004825 A1 | 1/2018 |

OTHER PUBLICATIONS

European Supplementary Partial Search Report issued in EP Application No. 19858031.8, mailed on Mar. 21, 2022.

European Supplementary Extended Search Report issued in EP Application No. 19858031.8, mailed on Jul. 21, 2022.

International Search Report mailed on Sep. 19, 2023 in International Patent Application No. PCT/US2023/019408, filed Apr. 21, 2023, 4 pages.

* cited by examiner

Mesh Points Table 1000

| LINE # | FREQUENCY CHANNEL | MEASUREMENT TIME | SIGNAL LEVEL | MEASUREMENT CONDITIONS |
|---|---|---|---|---|
| 1 | ARFCN# 2338 889.9 to 890.1 MHz | 2021-12-28T15:05:03.00Z UNIXTIME:1645200142UTC | Max=11 MJY/sr Mean=-70 dBm/m^2 Median=-90 dBFs Min= | ATTITUDE=(4527383.66, 181570.55, 5194142.9) ECEF BEAMWIDTH=(49.0767°, 2.2966°), 20°X20° BEAM POSITION ON GROUND=(52.9986°, -1.423775°) |
| 2 | ... | ... | ... | ... |
| 3 | ... | ... | ... | ... |
| 4 | ... | ... | ... | ... |
| ... | ... | ... | ... | ... |

FIG. 10

Polygons Table — 1100

Terrestrial Cell Site Locations Subtable

| LINE # | LAT | LONG | ALT | AZI | TILT | BW | ... |
|---|---|---|---|---|---|---|---|
| 1 | | | | | | | |
| 2 | ... | ... | ... | ... | ... | ... | ... |

Terrestrial Cell Site Locations Subtable

| LINE # | LAT | LONG | IMSI | IMEI | LASTTIME | ... |
|---|---|---|---|---|---|---|
| 1 | | | | | | |
| 2 | ... | ... | ... | ... | ... | ... |

Contract Terms: (Minimum Threshold Level = -120 dBm)

FIG. 11

Dynamic Coverage Table

| LINE # | SATELLITE # | POSITION (FROM THE SATELLITE CONSTELLATION) | | | | |
|---|---|---|---|---|---|---|
| 1 | 123456 | BOUNDINGBOX[ {18.022°, -74.4809°}, {20.089°, -71.622°} ] | | | | |
| 2 | ... | ... | ... | ... | ... | |
| 3 | ... | ... | ... | ... | ... | |
| 4 | ... | ... | ... | ... | ... | |
| ... | | ... | | | | |

Outage Watchlist Table 1300

| LINE # | ITEM | POSITION | | |
|---|---|---|---|---|
| | | | ... | ... |
| 1 | Earthquake and Tsunami, hurricane & Typhon, Snowstorms and other forecasted extreme weather with timeframe | GEOCIRCLE[{LAT,LONG,RADIUS}] POLYGON[{{LAT1,LONG1}, {LAT2,LONG2},...}], TIMEFRAME= BOUNDINGBOX[ {-23.9595, -179.182},{-15.5663, -1733.747}] FROM JAN 25, 2022 TO JAN 27M, 2022; ETHT ALERT BOUNDINGBOX[ {-23.9595, -179.182},{-15.5663, -1733.747}] FROM JAN 25, 2022 TO JAN 27, 2022; ETHT ALERT | | |
| | Cellular Broadcast Messages from Nearby Cell Towers | CELL TOWER A, CELL TOWER B,... TIME FRAME=XXX, MESSAGE CONTENT=YYY | | |
| ... | ... | ... | | |

FIG. 13

ORBITAL OR OTHER NON-TERRESTRIAL BASE STATION PREEMPTION AND/OR REPLACEMENT UPON TERRESTRIAL BASE STATION INCAPACITY OR FAILURE

CROSS-REFERENCES TO PRIORITY AND RELATED APPLICATIONS

This application is a non-provisional of, and claims the benefit of and priority from, U.S. Provisional Patent Application No. 63/363,479 filed Apr. 22, 2022, entitled "Satellite Replacement for Terrestrial Base station Failure."

The entire disclosures of applications/patents recited above and hereinbelow are hereby incorporated by reference, as if set forth in full in this document, for all purposes:
1) U.S. Pat. No. 10,084,535, issued Sep. 25, 2018, entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Pat. No. 10,742,311, issued Aug. 11, 2020, entitled "Simplified Inter-Satellite Link Communications Using Orbital Plane Crossing to Optimize Inter-Satellite Data Transfers" (hereinafter "Speidel II"); and
3) U.S. patent application Ser. No. 17/570,329, filed Jan. 6, 2022, entitled "Satellite Communication System Transmitting Navigation Signals Using a Wide Beam and Data Signals Using a Directive Beam" (hereinafter "Speidel III").

FIELD

The present disclosure generally relates to satellite coverage of mobile communications generally and more specifically, satellite replacement coverage upon terrestrial cell network incapacity.

BACKGROUND

Mobile communications infrastructure can be used to connect devices to networks and carry voice, data, etc. signals between a mobile device and some other infrastructure such as servers and other user devices. For example, a first user with a first mobile telephone can communicate with a second user having a second mobile telephone by way of software and a radio circuit in the first mobile telephone sending wireless signals according to a pre-agreed protocol between the first mobile telephone and a nearby cell tower that handles cellular telephone traffic. The cell tower which might be fixed in place and supplied with power from a power grid and wired into a telephone network, a packet-switched network, or other communications infrastructure. The network infrastructure can then in turn be connected directly or indirectly with a second cell tower (assuming the second user is not also using the first cell tower) and the connection can be completed between the second cell tower and the second mobile telephone. Many such connections can be accomplished at the same time, assuming that each mobile telephone is within range of a cell tower that is an operable cell tower. In various circumstances, such as loss of power, storms, natural disasters, other emergencies, network overloads, cyberattacks, etc., a cell tower might be unable to carry any traffic, unable to carry the amount of traffic needed to support the number of mobile telephone devices in the area and in such situations cell tower, or multiple cell towers, would experience some form of complete or partial incapacity. Where incapacity is present, some users might not be able to engage in communications, which can be problematic in certain situations, especially in the case of sudden natural disasters where users are attempting to deal with the natural disaster and need a means of communicating with others separated over a considerable distance.

Some communications infrastructures might provide for an on-site remediation of incapacity, such as maintaining battery power supplies and/or generators on the site at terrestrial cell towers or building sites in case of failure of the power grid that normally supplies power to the cell towers. Another approach is to use portably deployed equipment as a network backup solution, such as using "cell on wheels" (COW) equipment moved temporarily to a geographic location where outages are occurring. However, these solutions are temporary and may not be a sufficient in cases of prolonged network outages.

Improved support for addressing communications network incapacity is desirable.

An example of modifying base station antenna tilt and direction to mitigate incapacity in neighboring cells can be found, for example, in U.S. Pat. No. 7,577,103 B2 to Flanagan, et al.

SUMMARY

One general aspect includes a method for providing backup network services in a communications network used by mobile terminals. The method includes receiving information regarding a terrestrial base station of the communications network, using a first non-terrestrial base station and the information regarding the terrestrial base station, detecting an incapacity of the terrestrial base station, using the first non-terrestrial base station, identifying a second non-terrestrial base station within a communications range suitable to provide backup service to the communications network, and introducing the second non-terrestrial base station as a new base station of the communications network, via the second non-terrestrial base station, for at least one mobile terminal of a plurality of mobile terminals capable of connecting to the terrestrial base station at least during other than a period of incapacitation of the terrestrial base station, carrying traffic between the at least one mobile terminal and the communications network. Other embodiments of this aspect include corresponding computer systems, apparatus, and computer programs recorded on one or more computer storage devices, each configured to perform the actions of the methods.

In some embodiments, the first non-terrestrial base station and the second non-terrestrial base station are the same. In some embodiments, the traffic includes at least one of voice, text messaging, or data. In some embodiments, detecting the incapacity is done, in part, at a ground station and, in part, at the first non-terrestrial base station. In some embodiments, identifying the second non-terrestrial base station is based on a geographic location of the terrestrial base station and an orbital position of the second non-terrestrial base station. In some embodiments, detecting the incapacity is done by analyzing signals within a spectrum used by the terrestrial base station. In some embodiments, the analyzing signals is done on the first non-terrestrial base station. In some embodiments, the analyzing signals is done at a ground station and results of the analyzing are communicated to the first non-terrestrial base station. In some embodiments, the second non-terrestrial base station operates as a base station that appears to the at least one mobile terminal to be compatible with a communications protocol used between the at least one mobile terminal and the terrestrial base station. In some embodiments, the method further includes advertising, to the plurality of mobile terminals capable of connecting to the terrestrial base station at least during other than a period of incapacitation of the terrestrial base station, an availability of the second non-terrestrial base station to carry traffic between the mobile terminals and the communications network. In some embodiments, the method further includes providing a spectrum analyzer capability in the first non-terrestrial base station, to be used to monitor spectrum occupancy of a terrestrial spectrum. In some embodiments, detecting the incapacity of the terrestrial base station is done at least in part with the spectrum analyzer capability. In some embodiments, the spectrum analyzer capability employs physical components of the first non-terrestrial base station, but runs concurrently in software, so that the first non-terrestrial base station may be providing service in a first portion of its potential coverage area while monitoring spectrum usage in at least a second portion of its potential coverage area. In some embodiments, the method further includes providing filter switches within the first or second non-terrestrial base station, to enable a radio of the first or second non-terrestrial base station to tune to and receive frequency bands used by the terrestrial base station. In some embodiments, introducing the second non-terrestrial base station as a new base station of the communications network includes triggering the second non-terrestrial base station to begin operating at least partially within a spectrum vacated by incapacitated terrestrial base station. In some embodiments, introducing the second non-terrestrial base station as a new base station of the communications network includes triggering the second non-terrestrial base station to begin operating at least partially within a geographic region vacated by incapacitated terrestrial base station. In some embodiments, the method further includes displaying occupancy information to a human operator regarding changes in the monitored spectrum occupancy, and receiving authorization from the human operator to introduce the second non-terrestrial base station as the new base station of the communications network. In some embodiments, the method further includes, with the first or second non-terrestrial base station, detecting a resumed capacity of the terrestrial base station, and disconnecting the second non-terrestrial base station from the network. Implementations of the described techniques may include hardware, a method or process, or computer software on a computer-accessible medium.

One general aspect includes a method for providing backup network services in a communications network used by mobile terminals. The method includes from a device in communication with the network, receiving a first message including information regarding an incapacity of a terrestrial base station of the communications network, or of a future event predicted to cause an incapacity of the terrestrial base station, based at least in part on the first message, identifying at least one non-terrestrial base station with predicted line of sight to the terrestrial base station or to at least a portion of a radio coverage region thereof, introducing the at least one non-terrestrial base station as at least one new base station of the communications network, via the at least one non-terrestrial base station, for at least one mobile terminal of a plurality of mobile terminals capable of connecting to the terrestrial base station at least during other than a period of incapacitation of the terrestrial base station, carrying traffic between the at least one mobile terminal and the communications network, from the device in communication with the network, receiving a second message including information regarding a resumed capacity of the terrestrial base station, and based at least in part on the second message, disconnecting the at least one non-terrestrial base station from the network. Other embodiments of this aspect include corresponding computer systems, apparatus, and computer programs recorded on one or more computer storage devices, each configured to perform the actions of the methods.

In some embodiments, the device is an internet of things (IoT) device or the message is a simple messaging service (SMS) message. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 10 is an example mesh points table according to various embodiments.

FIG. 11 is an example polygons table according to various embodiments.

FIG. 12 is an example dynamic coverage table according to various embodiments.

FIG. 13 is an example outage watchlist table according to various embodiments.

DETAILED DESCRIPTION

Figure 1:
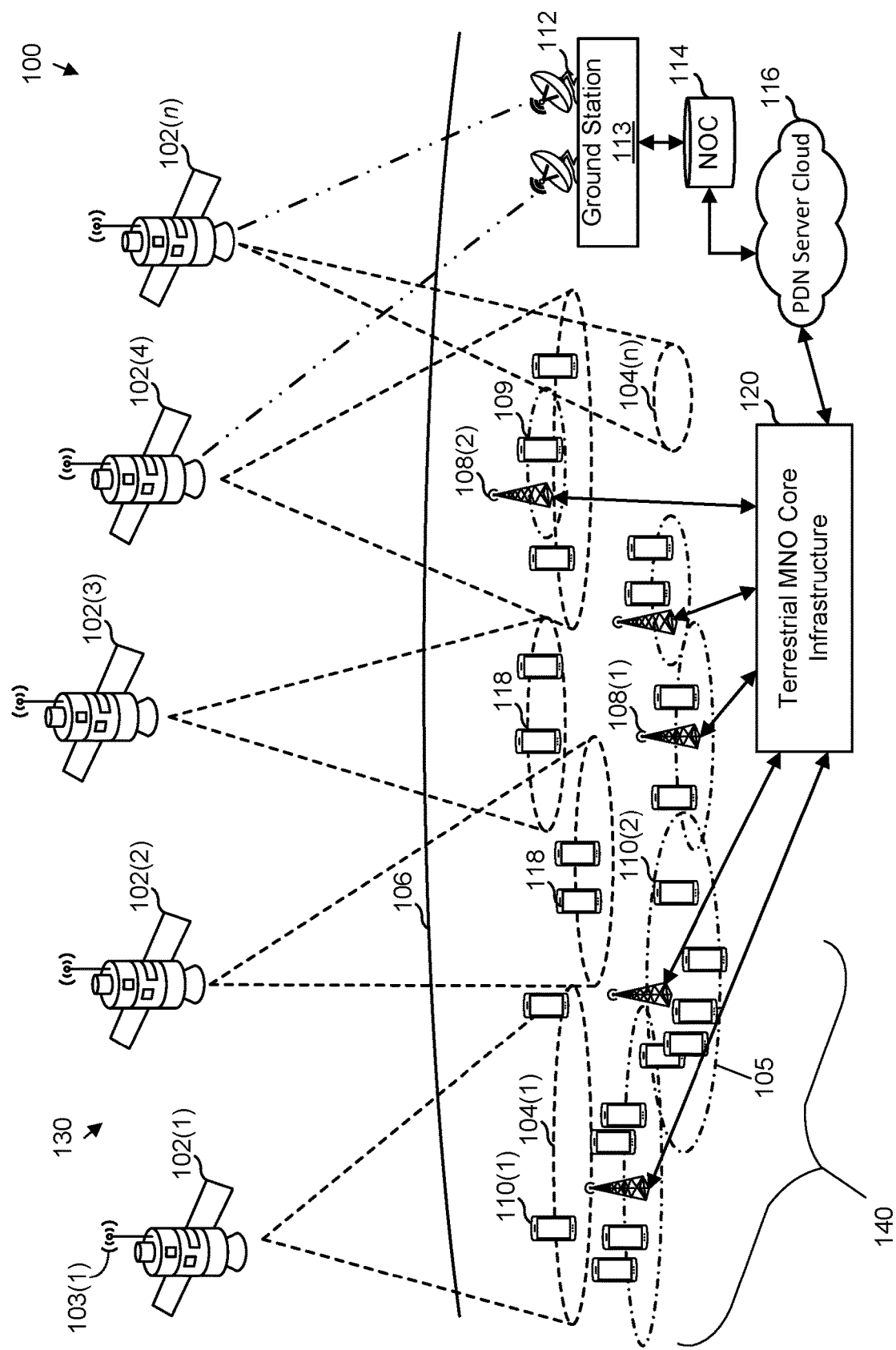
FIG. 1 is a diagram of the mobile satellite network architecture with legacy mobile stations and ground station with network operations center shown according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without some or all of the specific details. Furthermore, well-known features may be omitted or simplified in order not to obscure the embodiment being described.

Overview of Communications Network Infrastructure

Mobile communication involves signals being sent between a terminal and a transceiver that can provide an interface for the terminal to communicate to and from other network resources, such as telecommunication networks, the Internet, and the like, to carry voice and data communications. The transceiver might be a component in a base station that handles traffic from multiple transceivers. The base station might also include antennas and encryption/decryption elements. The base station may have a wired, wireless, and/or optical channel to communicate with those other network resources. A base station might support one or more transceivers and a given base station for supporting mobile communication might have a base station controller.

A terminal might be some electronic user equipment that interacts in some way with a satellite or satellite signals. Examples might include user equipment (UE) that is configured or designed for using some protocol or protocols, a mobile phone, which might be a full-featured smartphone or otherwise, or some internet-of-things (IoT) connected device. In many cases, it might be assumed that the terminal is portable in that it can be easily moved from place to place and in operation is typically stationary or that a terminal is mobile in that it needs to be designed to operate while being moved relative to the surface of the Earth.

Examples of terminals include mobile phones, cellular phones, smartphones, and other devices equipped to communicate with a wireless network infrastructure. It should be understood that an operation, function or characteristic of a terminal might also be that of a station that is effectively or functionally a mobile station, but is not at present mobile. In some examples, the terminal might be considered instead a portable station that can be moved from place to place but in operation is stationary, such as a laptop computer with several connected peripherals and having a cellular connection, or the terminal might be stationary, such as a cellular device that is embedded in a mounted home security system. A terminal might be referred to as a terrestrial mobile device, a user receiver, user equipment (UE), or the like.

Examples of base stations include cellular telephone towers, macro-cell transceivers, femto-cell transceivers, picocells (which might have only one transceiver) and the like. Base stations communicate with terminals wirelessly. Some base stations have a backhaul (the interface between the base station and the other network resources) that is wired, such as with a cellular telephone tower, while some might have a wireless backhaul, such as a microwave point-to-point bidirectional communications channel. Thus, a base station might be any of several different types of electrically powered devices that receives data streams from terminals and processes those and/or forwards them to other network resources, as well as receiving data streams from the other network resources and processing those and/or forwarding them to terminals over the base station-terminal link(s). In this sense, a base station acts as an access point for the terminal, to allow a terminal to access network resources such as a telecommunications network, the Internet, private networks, etc. The access might be used to route voice calls, other calls, texting, data transfer, video, etc.

Each base station typically includes a processor, memory, radio circuitry, power source(s), interfaces to the telecommunications network, diagnostic interfaces and the like to perform its functions. The base station processor might read from program memory to perform desired functions. For example, the program memory might have instructions for how to form a data stream, how to pass that to the radio circuitry, how to communicate with the telecommunications network, how to read an internal clock to determine the value of a system clock to appropriately time listening and sending, how to set appropriate frequencies for transmissions and reception, how to keep track of the various terminals and their state, location, allocation, etc. and perhaps store that into locally available memory.

A telecommunications network behind a base station might include a network and switching subsystem that determines how to route data to an appropriate base station and how to route data received from a base station. The telecommunications network might also have infrastructure to handle circuit connections and packet-based Internet connections, as well as network maintenance support. In any case, the base station might be configured to use some protocols with terminals and other protocols with the backhaul. In operation, a base station might require power and data infrastructure to support its capacity.

For simplicity of explanation, in many examples herein, communications is described as being between a base station and a terminal for interactions with one terminal, but it should be understood that the interactions might be from a base station to a transceiver, to a radio circuit, to an antenna, to a terminal antenna, a terminal radio circuit, to software/hardware in the terminal, and a corresponding path in the other direction from the terminal to the base station. Thus, in some examples where a base station is communicating with a terminal, it is via a transceiver and the example ignores mention of the other transceivers that the base station might be controlling.

The protocols for communication between terminals and base stations might be such that they are standardized so that any standard terminal can communicate with any base station, assuming range requirements are met and membership requirements are met (e.g., that the terminal has identified itself to the base station in such a manner that the base station, or a service that the base station uses, determines that the terminal is a member of an authorized group or otherwise authorized to use the services provided by the base station. Some example protocols that a base station might use include GSM (Global System for Mobile Communications; trademarked by the GSM Association) 2G+ protocols with Gaussian minimum-shift keying (GMSK), EDGE protocols with GMSK and 8-PSK phase-shift keying. A base station might handle multiple transceivers that use multiple sets of carrier frequencies within a spectrum band of wireless spectrum that the protocol allows for. Thus, where a spectrum band is logically divided into carrier frequency spectra, a transceiver might use channels that use one (or more) of those carrier frequencies to communicate with a terminal. The protocol might specify that for a given channel, there is an uplink subchannel and a downlink subchannel, possibly separated in carrier frequency from each other. In some cases, the uplink subchannel has a carrier frequency adjacent to that of the downlink subchannel. In some cases, all the uplink subchannels are in one spectrum band and all the downlink subchannels are in another spectrum band. For ease of explanation, sometimes a channel is described as having an uplink portion and a downlink portion as if it were one channel, even if the portions are widely separated in carrier frequency.

A satellite might be an object, vehicle, etc. that is configured, designed, constructed, etc. to operate in an orbit, such as an Earth orbit, perhaps designed consistent with a particular orbital altitude as a design target and/or a particular orbital orientation. A satellite might include various electronic components that allow for communication among satellites, communication with fixed ground stations that are specific to satellite support, command, control, etc., and/or communication with terrestrial devices such as terminals. A satellite need not be in orbit to perform a function described herein. For example, the present disclosure can encompass a system that could be deployed in orbit but that is operating on Earth, either in a testing mode or a production mode.

A satellite might be capable of transmitting signals over beam patterns and a constellation of satellites might provide cellular coverage of any location on the Earth with one or more beams using one or more satellites simultaneously. Each beam might implement a full-duplex bandwidth for simultaneous uplink and downlink communications using protocols such as global system mobile (GSM); or frequency division duplex (FDD) or time division duplex (TDD) long term evolution (LTE); or FDD or TDD 5G new radio (NR). Some beams could implement receive-only operations to support uplink measurement of signals from terminals or base stations on the ground.

Cells of a cellular communication network might be implemented via narrow beams wherein each beam serves as a cell (e.g., a base transceiver station (BTS), an enhanced node B (eNB), or a gNB). Although these examples are used in the present disclosure, it is understood that other types of cells may be used instead or in addition. These cells could employ standard control and user plane channels typically implemented in a common GSM, LTE, NR, etc., network. One of these control channels might be the broadcast control channel (BCCH).

In one embodiment, the satellite communications constellation might deploy thousands of satellites in low Earth orbit (LEO) at an altitude of approximately 500 km. The orbits might be circular or elliptical in shape. Other embodiments may deploy fewer or more satellites in orbits lower than or higher than 500 km. For simplicity, in one embodiment, the orbit configuration might be consistent with a Walker style constellation. In this configuration, the satellites are placed in orbits with common altitudes. The satellite positions may be evenly spaced within inertial planes around the Earth where the inertial planes are equally spaced around the Earth with planes of satellites equally, at least approximately, spaced in inertial longitude of the ascending node.

For data communications, a satellite might be part of a constellation that forms a space-based network of satellites designed to communicate with standard mobile handsets according to some pre-agreed protocol. Examples of data communication technologies and protocols include time division multiple access (TDMA), frequency division multiple access (FDMA), orthogonal frequency division multiplexing (OFDMA), third generation partnership project (3GPP) technologies such as GSM (2G), code division multiple access (CDMA, 3G), universal mobile telecommunications system (UMTS, 3G), LTE (4G), NR (5G), and/or others. Examples and details are provided in Speidel I through Speidel III.

While most of the examples and details here relate to an orbital transceiver that is adapted, configured, programmed, etc., to close communications with terminals that operate as if those design assumptions still hold true, these techniques can be used beyond just the orbital example. For example, they might be used for base stations that are located high enough that the slant angle is greater than 120 km. For example, if a base station is able to be mounted at an altitude of 1,130 meters, that is enough to allow for a line of sight (slant range) to a terminal of 120 km or more. Platforms such as airplanes, unmanned aerial vehicles (UAVs), high altitude drones, hot air balloons, high altitude balloons, suborbital vehicles, space planes, mountains, or even some very large towers might be conditions where some or all of these techniques would find utility. It is also worth noting that the techniques described could even be deployed on a ground-based base station but with an antenna pointing to provide services to terminals operating on platform that create long communication distances (such as in excess of 120 km) and/or high Doppler shift environments, such as greater than around 200 kilometers per hour (KPH)). This might include conditions in which the terminal is operating on the ground, in the atmosphere, or in a space environment and the base station is on the ground and either mobile (e.g., on some vehicle) or perhaps stationary.

As used herein, "footprint" refers to the area on the ground that is within range to close a communications channel with a base station on a satellite. In examples herein, circular footprints might be used, but it should be understood that the footprints might not be circular and might depend on obscuring factors, shape of the surface of the Earth, atmospheric conditions, etc. In some instances, the footprint is a "design footprint" that is different than an actual footprint. For example, a satellite might actually be able to communicate with a mobile device that is some distance away and thus within the actual footprint of the satellite, but for selectivity, performance, or other reasons, a system that uses that satellite is designed for a different footprint, such as a smaller footprint than the actual footprint, that is the design footprint. A boundary of a design footprint might be the circle or ellipse cast onto the Earth by the satellite centered on the surface point just below the satellite and having a radius that the satellite is supposed to cover by design, such a certain slant range.

As used herein, "ground" can be used to refer to the location of a terminal, but it should be understood that "ground" is not limited to the surface of the Earth. When a terminal is described as being ground-based, or on the ground, it could be in the hands of a person standing on the surface of the Earth, on the surface of a body of water, somewhat below the surface of the Earth or somewhat below the surface of a body of water, in an upper floor of a building, in a structure that is not exactly at ground level, in an airplane or otherwise aloft but in the atmosphere, or similar locations. However, for clarity of exposition, the terminal might be described as being on the ground to distinguish from elements being in orbit.

As used herein, "being in orbit" refers to being at a location and travelling at a speed relative to an inertial frame that is stationary (more or less) with respect to the center of gravitation of the Earth and experiences sufficiently little atmospheric drag at that location such that the orbit can be easily maintained. In some examples herein, an orbital distance is given and that refers to, approximately, a typical distance from an average or ordinary point on the surface of the Earth, as is conventional for describing orbits. "LEO" can be used in some examples, and it should be understood that the examples might apply to orbits that might be somewhat outside what is conventionally defined as LEO, but still considered to be orbits. Unless otherwise indicated, being in orbit can also describe orbits around other celestial bodies, such a Mars, the Moon, other planetary moons, or even points of interest, such as L1 or L2. In many of the examples herein, the base station is in orbit around the Earth and the terminal is terrestrial. It is possible to use the teachings herein for other situations, such as where the base station is in an airplane, an unpiloted autonomous vehicle, a balloon, etc. where similar difficulties are encountered.

Additionally, the satellite capability described herein can be used to identify emerging new and otherwise untapped wireless demand, such as from new building construction or parks or attractions that have wireless demand but limited or no terrestrial capacity. The satellite capability described herein can service such emerging users and alert terrestrial mobile operators of the opportunity to build new terrestrial base station to provide full capacity to such locations.

Currently, mobile network operators identify such growth opportunities through analysis of the location of call drops— typically in fringe areas of existing coverage that needs extension to the gradually growing contours. However, for disconnected areas of growing demand, operators may look to zoning or real estate transactions to anticipate where to new communities or attractions may appear. This process may be tedious and not well automated. With the present disclosure's mobile satellite capabilities observing spectrum usage and attempting to connect to the satellite's base station, these emerging areas of demand can be served, and terrestrial network planners can be alerted to the opportunity to better serve areas of growing demand.

Non-Terrestrial Base Station Support in Cases of Incapacity, Generally

Embodiments herein can be used to provide network backup using a space-based cellular network or non-terrestrial network (NTN) that recognizes failed terrestrial networks or other incapacity, possibly by sensing radio spectrum usage observed by space-based spectrum analysis capabilities. For example, a geographic region known to normally have active cellular radio transmissions but that has ceased transmissions is likely to have need of land-mobile-satellite service as a backup.

An example non-terrestrial network (e.g., a space-based cellular network) that provides cellular radio service to existing mobile phones might, for example, be that described in Speidel I that is able to operate with the radio spectrum frequencies used in traditional terrestrial cellular networks. As a result, a satellite can be equipped with a cellular base station capable of tuning to and measuring the signal strength in the same frequency bands as those used by the terrestrial network can be useful. With a conventional mobile base station architecture, a cellular base station of a satellite would be inherently capable of receiving and measuring the signal strength of uplink traffic from user terminals such as cellular handsets on the ground.

With a change to one or more radios of a satellite, the satellite may be made capable of tuning in to the downlink frequency bands as well, and of measuring the transmission signals made by terrestrial base stations. The absence of such signals might indicate that terrestrial network, or a portion thereof, is out of service.

The cellular base station might be an orbital base station or some other non-terrestrial base station (NTBS) that exists off the surface of the earth. Examples may, for example, include orbital base stations, balloon-borne base stations, airborne base stations, etc. A cellular base station implemented on a satellite might be substituted for a terrestrial base station upon a determination of incapacity of that terrestrial base station. The determination might be made by attempting to communicate with that terrestrial base station, by monitoring for transmissions from that terrestrial base station, and/or based on information provided by a network monitoring system that might detect incapacity of that terrestrial base station.

The incapacity might be due to the loss of power, the loss of the base station (e.g., a cell tower) itself, the inability to handle a present traffic demand, or other forms of detectable incapacity. In general, an incapacity might be some state or a change of state of one or more terrestrial base stations that causes a terrestrial base station to be incapable, in whole or part, to handle its present traffic demand. The present traffic demand might be the normal or typical traffic for a terrestrial base station, or it might include additional demand. For example, where a terrestrial base station is configured to handle a particular volume of traffic and is handling that particular volume of traffic but because of some occurrence, the network is imposing a much higher volume of traffic on the terrestrial base station, that can be considered an incapacity of the terrestrial base station, notwithstanding that it is handling its designed volume of traffic.

The non-terrestrial base station can step in to address network needs in the face of the incapacity and might do so as an instantaneous fail-over or after some time has passed. For example, the non-terrestrial base station might determine that an incapacitation has occurred when it observes changing spectrum usage of a radio spectrum as a function of space, time, and frequency. A terrestrial base station might determine that an incapacitation has occurred when it receives a message from a non-terrestrial base station indicating that one or more terrestrial base stations (other base stations or even the terrestrial base station that is determining an incapacitation could determine it from messages from itself) is sending cellular broadcast messages to mobile phones within their range where the cellular broadcast messages related to events that might be associated with terrestrial cell towers in a nearby region becoming inoperable and/or incapacitated. For example, if a cell tower is transmitting a cellular broadcast message alerting mobile devices of a tornado warning and a non-terrestrial base station picks up that alerting cellular broadcast message, an orbital network management system might infer that an outage in the area of the transmitting cell tower is likely to occur.

In a specific embodiment, an orbital network management system (whether ground-based, space-based, autonomous, human-operated, or combinations thereof) can direct a non-terrestrial base station to stand in as a terrestrial base station. Examples of non-terrestrial base stations being used in areas where terrestrial base stations are not present, even where the supported terminals are not specifically adapted for satellite communications, are illustrated in Speidel I, for example.

Aspects of Backup Network Services and a Backup Network to Implement Such Services Networks used for communication by mobile terminals, such as smartphones and IoT devices, can fail. For example, a natural disaster might render terrestrial cell towers in a large region inoperable and/or incapacitated. Incapacity might be incapacity of sending and receiving signals, incapacity of moving data and/or signals between a base station and a greater network, bandwidth limitations, etc. Incapacity might be due to damage to base station hardware, loss of power, obstructions, etc. The network services might be used to convey data communications traffic comprising voice, text messaging, data, etc. Messages might include simple messaging service (SMS) messages.

Non-terrestrial base stations, such as orbital base stations on satellites, floating base stations, airborne base stations, etc., can step in to take over some network services when terrestrial base stations are incapacitated, in whole or part. The orbital base stations, or ground-based systems, can perform the tasks, testing, and sensing needed to determine or detection such incapacity of terrestrial cell towers. In some situations, it might be preferred that such backup base stations consider whether there is an outage, where the outage is, and the extent of the outage, and use that information in decision-making to determine if the backup base station is to intervene and provide network services that would otherwise be performed by some set of terrestrial base stations. Status of terrestrial base stations, and/or the communications network generally, might be determined by a network component that is remote and/or distinct from a non-terrestrial base station and that network component might convey its determinations to the non-terrestrial base station that is to be a backup base station.

A detecting non-terrestrial base station might detect an incapacity of one or more terrestrial base stations and a backup non-terrestrial base station might step in to take the place of an incapacitated terrestrial base station if the backup non-terrestrial base station is within a communications range suitable to provide backup service to the communications network. In some cases, the non-terrestrial base station that detects the incapacity might be the base station that provides the backup service. In other cases, the detecting non-terrestrial base station is a first non-terrestrial base station and the backup non-terrestrial base station is a second non-terrestrial base station distinct from the first non-terrestrial base station.

The backup non-terrestrial base station might connect with mobile terminals by appearing to be a terrestrial base station, which would allow for providing service to mobile terminals that are not specifically configured for non-terrestrial base station connectivity. For example, the backup non-terrestrial base station might be an orbital base station having operating characteristics that a mobile device is not programmed for, such as a base-station-to-mobile-device distance larger than expected by protocols used by the mobile device and/or a relative velocity between the base station and the mobile device that is not expected by those protocols.

The incapacity might be detected at a ground station, at a detecting non-terrestrial base station, or some combination thereof. Detecting the incapacity might be done by a network controller, a base station, or elsewhere, by analyzing signals within a spectrum used by the terrestrial base station. For example, an overpassing orbital base station might listen for signals expected from the terrestrial base station and if not detected, assume that the terrestrial base station is incapacitated, in whole or part. In another approach, the listening is done at a ground station and results of the analyzing are communicated to a non-terrestrial base station. Listening ground stations might be located based on where terrestrial base stations are located or where outages are likely but that need not be the case.

A network controller might select an orbital base station as the backup non-terrestrial base station (which could be the detecting non-terrestrial base station or a different base station) from among available options based on geographic location of the incapacitated terrestrial base station and an orbital position of the backup non-terrestrial base station.

The backup non-terrestrial base station might operate as a base station that appears to at least one mobile terminal to be compatible with a communications protocol used between the at least one mobile terminal and the incapacitated terrestrial base station. The backup non-terrestrial base station might be introduced to a communications network as a new base station by triggering the backup non-terrestrial base station to begin operating at least partially within a spectrum vacated by an incapacitated terrestrial base station. The backup non-terrestrial base station might be introduced to a communications network as a new base station by triggering the backup non-terrestrial base station to begin operating at least partially within a geographic region vacated by an incapacitated terrestrial base station.

The network controller and/or a backup non-terrestrial base station might advertise, to mobile terminals capable of connecting to a terrestrial base station, an availability of the backup non-terrestrial base station to carry traffic between the mobile terminals and the communications network. This advertising might be sent via the terrestrial base station during other than a period of incapacitation of the terrestrial base station.

The network controller and/or a backup non-terrestrial base station might comprise a spectrum analyzer to be used to monitor spectrum occupancy of a terrestrial spectrum. Detecting incapacity of a terrestrial base station might be done at least in part with such a spectrum analyzer capability. The spectrum analyzer might employ physical components of the detecting non-terrestrial base station but run concurrently in software, so that the detecting non-terrestrial base station can provide service in a first portion of its potential coverage area while monitoring spectrum usage in at least a second portion of its potential coverage area. For example, where the spectrum occupancy for a terrestrial base station is directed by a protocol, such as a protocol expectation of the terrestrial base station periodically broadcasting availability messages within a certain frequency band, the spectrum analyzer can be programmed to detect the lack of those expected messages and/or a lack of signals within an expected band. The detecting non-terrestrial base station and/or the backup non-terrestrial base station might include filter switches to enable a radio of to tune to and receive frequency bands used by a terrestrial base station.

A network controller might send to a human-readable display information regarding changes in the monitored spectrum occupancy and receive authorization from a human operator to introduce the backup non-terrestrial base station as a new base station of a communications network.

The network controller, the detecting non-terrestrial base station, and/or the backup non-terrestrial base station might detect a resumed capacity of a terrestrial base station and in response, change their operating mode or send a message elsewhere in the communications network. For example, upon detecting a resumed capacity of a terrestrial base station, the backup non-terrestrial base station might disconnect from the communications network and/or cease or reduce its own advertising of its availability. The network controller and/or backup base stations might advertise to mobile terminals capable of connecting to the terrestrial base station that that that backup base station, or some other backup base station, is available to carry traffic between the mobile terminals and the communications network in a period of incapacitation of a terrestrial base station, and might also do so at other times.

The spectrum analyzer might employ physical components of a first non-terrestrial base station that run concurrently in software with service providing, so that the first non-terrestrial base station may be providing service in a first portion of its potential coverage area while monitoring spectrum usage in at least a second portion of its potential coverage area.

A non-terrestrial base station might include filter switches to enable a radio to tune to and receive frequency bands used by the terrestrial base station. A non-terrestrial base station might be introduced as a new base station of a communications network by triggering the non-terrestrial base station to begin operating at least partially within a spectrum vacated by an incapacitated terrestrial base station and/or operating at least partially within a geographic region vacated by incapacitated terrestrial base station.

A method for providing backup network services in a communications network used by mobile terminals can be provided by a device in communication with the communications network sending a first message comprising information regarding an incapacity of a terrestrial base station of the communications network or of a future event predicted to cause an incapacity of the terrestrial base station. Based at least in part on the first message, a network controller or base station might identify at least one backup non-terrestrial base station with a predicted line of sight to the terrestrial base station or to at least a portion of a radio coverage region thereof. The backup non-terrestrial base station might be introduced as a new base station of the communications network. The backup non-terrestrial base station might carry traffic for at least some mobile terminals of a plurality of mobile terminals capable of connecting to the terrestrial base station during a period of incapacitation of the terrestrial base station (and possibly other times as well).

If the backup non-terrestrial base station receives a message comprising information regarding a resumed capacity of the terrestrial base station, the backup non-terrestrial base station might, in response, disconnect from the communications network.

Analysis of spectrum occupancy might include using machine learning and artificial intelligence to identify trend patterns and changing clusters of geographic usage.

A communication network might be configured to provide information that might allow planners of a growing wireless network to identify demands in an area not currently served by terrestrial base stations. This might be implemented by receiving information regarding terrestrial terminals that are seeking connection to a wireless communications network in the unserved area, having a detecting non-terrestrial base station detect any incapacity of terrestrial base stations of a terrestrial network in the unserved area, reporting the incapacity as a lack of capacity in the terrestrial network to serve the growing wireless network demands in the unserved areas, and alerting network planners that the growing demands for wireless service in the unserved area are unmet demands, wherein the unmet demands are addressable either with a mobile satellite service or by building additional terrestrial wireless infrastructure to serve the unserved area.

Example of a Specific Implementation

A satellite with a space-based spectrum analyzer can monitor spectrum use and raise alerts if the spectrum use has changed materially, for example, identifying mobile network outages, renewed or new operations. As a result, a non-terrestrial network may initiate or increase satellite coverage in the event of an apparent outage of a terrestrial cellular network, or reduce satellite operations if the satellite observes the terrestrial network coming back online.

FIG. 1 is a diagram of the mobile satellite network architecture with legacy mobile stations and ground station with network operations center shown according to various embodiments. As shown there, a non-terrestrial network 130 might include a constellation of satellites 102 (e.g., satellite 102(1), satellite 102(2), . . . , satellite 102(n)), where at least one of satellites 102 includes a non-terrestrial base station (NTBS) 103. As will be shown below, the non-terrestrial base station may include a processor, software stored and/or executing on the processor, and a radio for cellular communication that is programmed according to a protocol recognizable by the ground-based cellular network 140 and/or terminals 110, such as cellular handsets, that would normally be served by the ground-based cellular network. Each satellite 102 may be capable of observing, monitoring, or communicating with a respective geographic area or footprint, which may or may not contain terminals 110, and which may or may not contain cell towers or other terrestrial base stations 108, whether presently functional or otherwise.

Examples of satellites in FIG. 1 include satellites 102(1), 102(2), . . . , 102(n). As used herein, the use of ellipses and "n" indicates that some number of like elements are present and the exact value of n need not be specified, while the use of "i" and "(i)" might refer to an unspecified one of those n like elements. It should be noted that "n" and "i" might be used as indicators in more than one place and they do not necessarily indicate a one-to-one correspondence across different uses. An example of NTBS 103 on a satellite includes orbital cellular base station 103(1) shown in FIG. 1, orbital cellular base station 203(1) shown in FIG. 2, orbital cellular base station 103(2) shown in FIG. 2, etc.

With a change to one or more radios of satellite 102, satellite 102 may be made capable of tuning in to the downlink frequency bands as well, and of measuring the transmission signals made by terrestrial base stations 108. The absence of such signals would indicate that terrestrial network 140, or a portion thereof, is out of service.

Data transmissions might be for sending messages from a ground station 113, to satellite 102, and then having satellite 102 forward the message to a terminal 110 using protocols for which that terminal 110 is programmed or configured. For example, satellite 102 might send a transmission using a protocol that a standard smartphone could receive. As explained herein, NTBS 103 might be an orbital base station or some other non-terrestrial base station that exists off the surface of the earth. Examples may, for example, include orbital base stations, balloon-borne base stations, airborne base stations, etc. A cellular base station implemented on a satellite 102 might be substituted for a terrestrial base station upon a determination of incapacity of that terrestrial base station. The determination might be made by attempting to communicate with that terrestrial base station, by monitoring for transmissions from that terrestrial base station, and/or based on information provided by a network monitoring system that might detect incapacity of that terrestrial base station. Such a monitoring system may be, or may be a portion of, terrestrial mobile network operator (MNO) core infrastructure 120, a public data network (PDN) server cloud 116, a network operations center (NOC) 114, or one or more ground stations 113.

Non-terrestrial network 130 may also include a ground station 113 that talks to satellites such as satellite 102(1), . . . , 102(n) and NTBS 103. In some embodiments, ground station 113 may provide a backhaul network for connecting to various network infrastructure such as the terrestrial mobile network operator core infrastructure. In other embodiments, one or more non-terrestrial base stations may be capable of communicating directly with terminals 110, whether or not those non-terrestrial base stations are in communication with a ground station 113. In the example shown in FIG. 1, the Earth's horizon 106 may block communications, and/or the radios used for communication may have a limited range, such as satellites 102(4) and 102(n), are each in communication with at least one antenna 112 of ground station 113, whereas satellites 102(1), 102(2), and 102(3) are not in communication with ground station 113. In such cases, one or more of satellites 102 may serve as communication relays, such that a satellite 102 may communicate indirectly with ground station 113 through the one or more relay satellites of satellites 102.

Terrestrial network 140 might be a conventional cellular network and may include one or more terrestrial base stations 108, at least one of which includes a radio for data communications with a terminal 110. Example terrestrial base stations may include permanent cell towers, temporary cell towers, or mobile base stations such as a cell on wheels (COW), e.g., a base station that can be deployed to replace or introduce a cell site as part of a restoration effort or to handle additional demand such as at a convention or festival or other unusually high demand event. Terrestrial network 140 may also include one or more terminals or handsets 110, at least one of which includes a radio for cellular communication that is programmed according to a protocol for communication with terrestrial base stations 108. The terrestrial network 140 may thereby facilitate communication between one terminal 110 and another terminal 110, or between a terminal 110 and a remote server (e.g., of the public data network server cloud 116).

Some terminals 110 may be located within the communications range 105 of a functional terrestrial base station 108, and may thus communicate normally with the terrestrial network 140. However, during a partial or complete network outage, some terminals 110 may be located in geographic region 104 that is outside communications range 105 of any functional terrestrial base station 108, but that is serviceable by non-terrestrial base station 103 of satellite 102. In such cases, terminals 110 may communicate with the non-terrestrial base station in the same manner (e.g., using the same protocols and signal strength) as they would normally use to communicate with a terrestrial base station 108. Some handsets or terminals 109, otherwise comparable to terminals 110, may be located within the communications range 105 of a functioning terrestrial base station 108, but may also be within geographic region 104 serviced by non-terrestrial base station 103 of satellite 102. In such instances, the terminal or handset may communicate with either non-terrestrial base station 103 or terrestrial base station 108. This may be useful for example in cases where handset or terminal 109 is near the edge of communications range 105 of terrestrial base station 108, and/or when communication with terrestrial base station 108 can only be established intermittently (e.g., due to terrain interference, power disruptions, etc.). In this way, non-terrestrial network 130 can replace a full ground-based network 140, or a substantial portion thereof, that is out of service.

Figure 2:
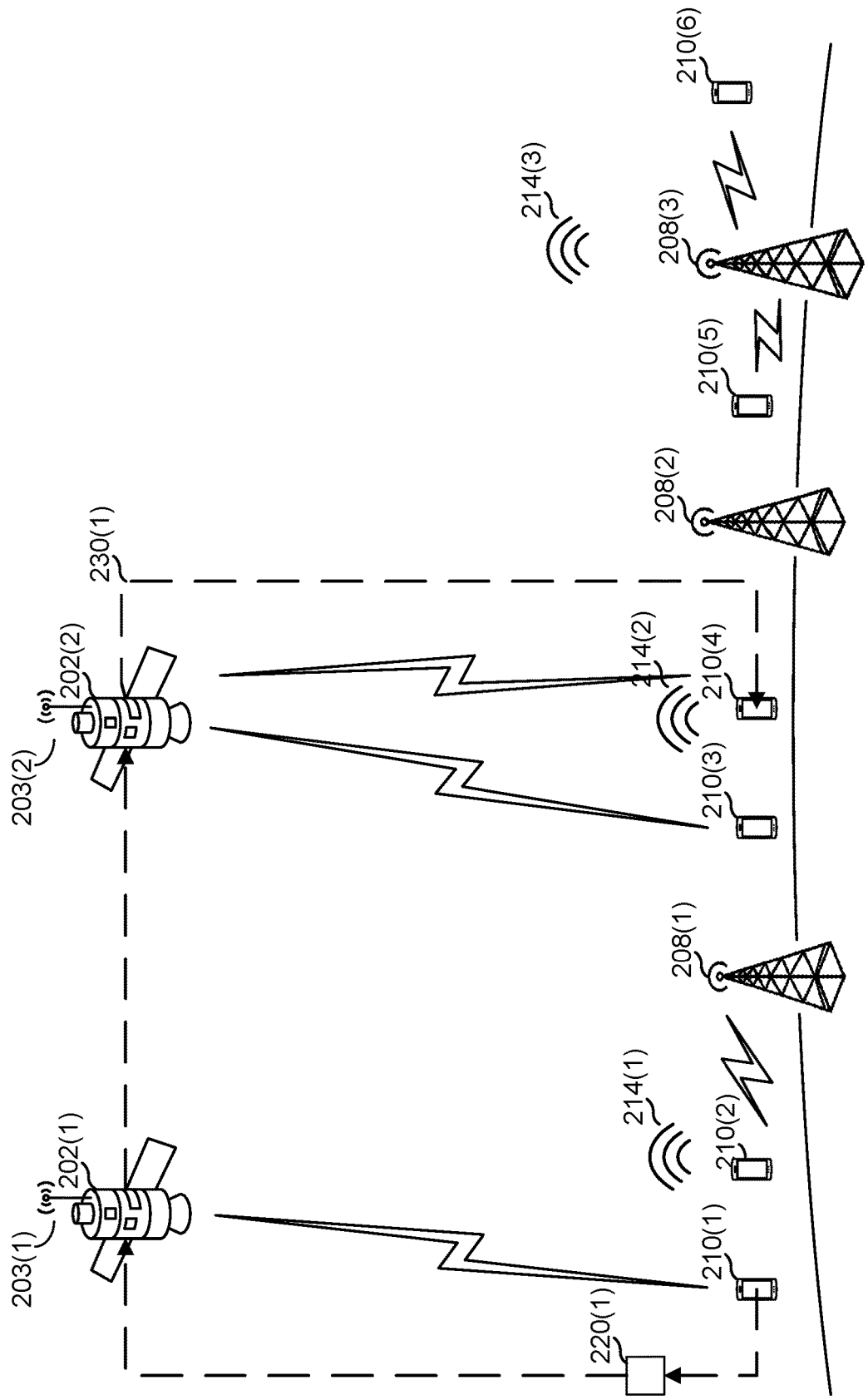
FIG. 2 illustrates an enhanced base station capable of both spectrum analysis and mobile network operation with multiple air interfaces according to various embodiments.

FIG. 2 illustrates enhanced non-terrestrial base stations 203(1), 203(2) capable of both spectrum analysis and mobile network operation with multiple air interfaces such as Global System for Mobile Communications (GSM) and Long-Term Evolution (LTE), according to various embodiments. Elements in FIG. 2 named similarly to elements in other figures, such as FIG. 1, might be similarly constructed.

In the example shown in FIG. 2, non-terrestrial base station 203(1) is located on a satellite 202(1) and might be capable of communicating directly with a terminal 210(1), such that a communication link 214(1) can be established between terminal 210(1) and a second terminal 210(2), where second terminal 210(2) is in communication with a functioning terrestrial base station 208(1). The terminals might mobile handsets or other wireless devices.

Non-terrestrial base station 203(2) of satellite 202(2) might be capable of communicating directly with a terminal 210(3) and a terminal 210(4), such that a communication link 214(2) can be established between terminal 210(3) and terminal 210(4) despite their proximity to a non-functional terrestrial base station 208(2). However, in a different region (e.g., outside the service interruption), a terminal 210(5) and a terminal 210(6) might be able to establish a communications link 214(3) with one another through a functioning terrestrial base station 208(3).

In this way, any terminal can establish a communication link with any other terminal, regardless of whether either or both are located within an area where the terrestrial network is experiencing an outage. A message might be passed along a message path from terminal to another terminal. In the example shown in FIG. 2, a message 220(1) is passed from terminal 210(1) to terminal 210(4) along a message path 230(1) that includes satellite 202(1) and satellite 202(2).

Figure 3:
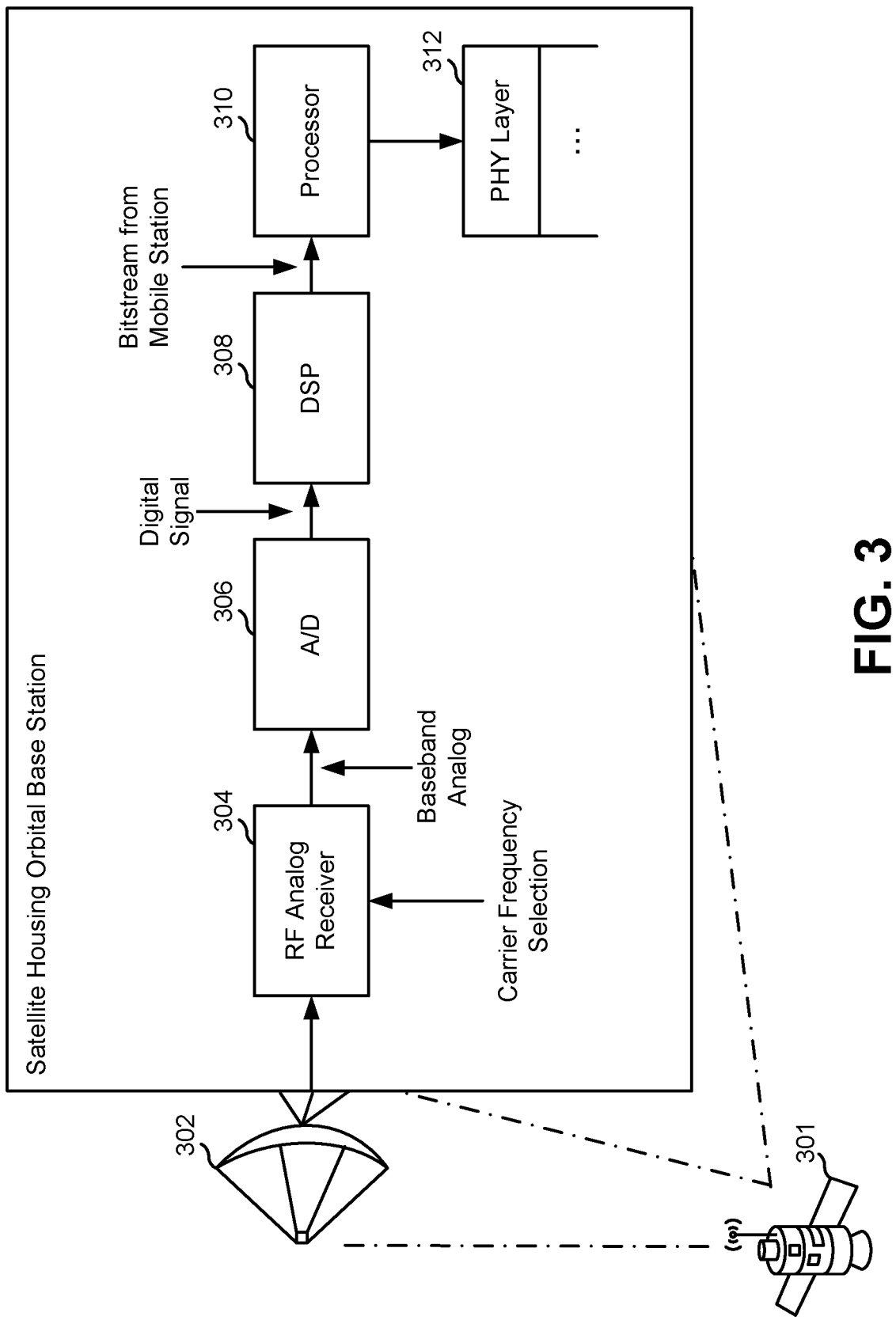
FIG. 3 is a block diagram of portions of a satellite that handles communications according to various embodiments.

FIG. 3 is a block diagram of communication portions 300 of a satellite that handles communications according to various embodiments. These communication portions 300 may, for example, form or be a part of a non-terrestrial base station such as an orbital base station illustrated in FIG. 1 and elsewhere. As shown in FIG. 3, a satellite 301 houses a non-terrestrial base station. An antenna 302 receives signals from within a geographic area or footprint as described elsewhere herein, and/or transmits signals to the geographic area or footprint. Antenna 302 provides an analog signal to an RF analog receiver 304. A base station controlled might select a carrier frequency and provide a carrier frequency of interest indication to RF analog receiver 304. Note that there might be more than one of such receivers, one per channel, implemented in hardware and/or software. An output of RF analog receiver 304 is a baseband analog signal, which is supplied to an analog-to-digital converter (A/D) 306 to generate a digital signal. The digital signal is processed by a digital signal processor (DSP) 308 that outputs a bitstream corresponding to a bitstream output by a mobile station/terminal and outputs it to a processor 310 that can then process the binary code from the bitstream, perhaps in a physical (PHY) network layer 312 in a conventional manner.

Figure 4:
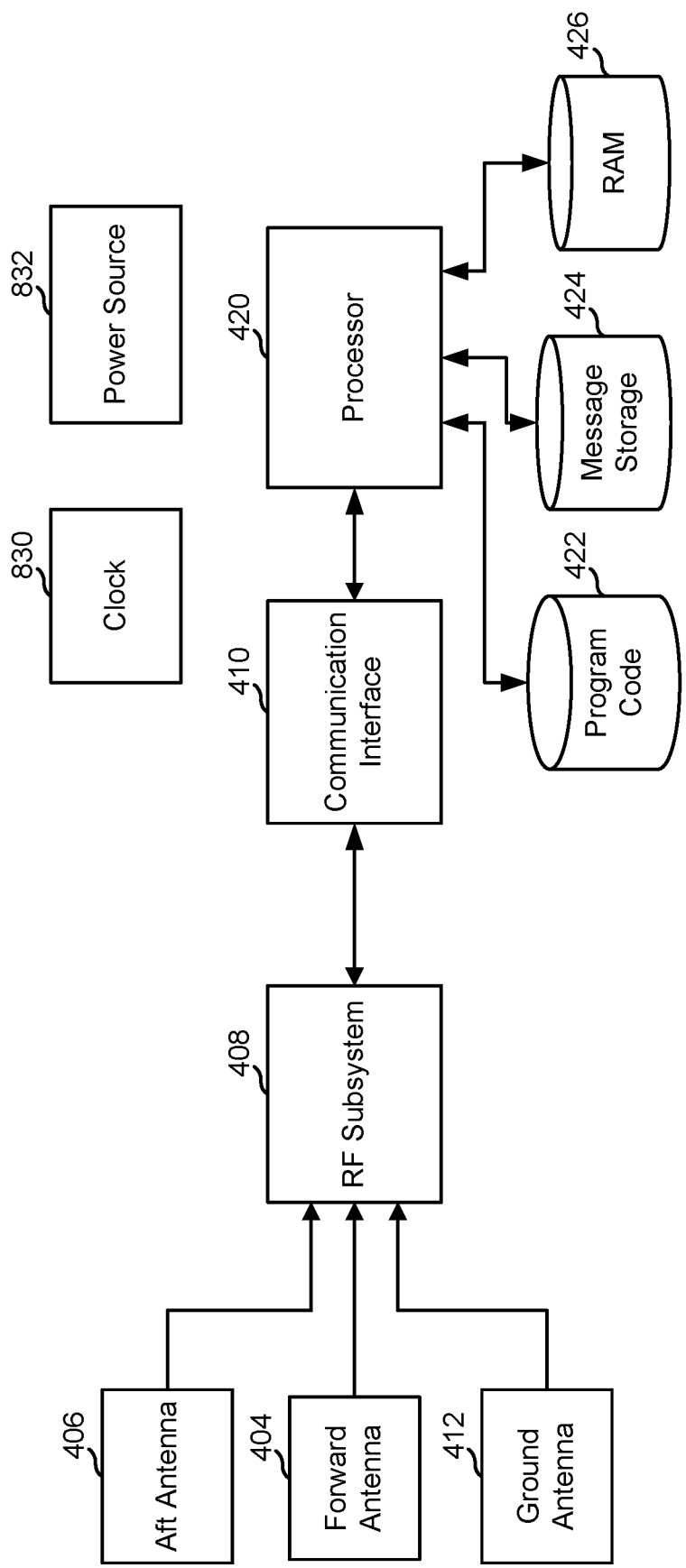
FIG. 4 is a block diagram of elements of satellite according to various embodiments.

FIG. 4 is a block diagram of elements of a satellite according to various embodiments. The interconnections shown are generally electrical connections, such as via wiring or busses, and might be contained within a satellite with the antennas mounted externally. In this example, an aft antenna 406, a forward antenna 404, and a ground antenna 412 are coupled to an RF subsystem 408 that can receive signals that impinge on those antennas and can send signals to those antennas for transmission. A communications interface 410 handles the sending of baseband data or signals to the RF subsystem 408 and receiving baseband data or signals from the RF subsystem 408. The data sent via the communications interface 410 can be specified by a processor 420 that operates according to program code stored in program code storage 422 and readable by processor 420. Alternatively, the processing functionality might be implemented by a field programmable gate array (FPGA) or other circuitry.

As shown, processor 420 also has access to random access memory 426 for various purposes and a message storage unit 424. In some implementations, program code storage 422, random-access memory 426, and message storage unit 424 might be a common data structure. Some or all of the elements shown might be provided power by a power source 432 and one or more clock signals might be provided by a clock 430.

Other elements, such as control systems, might be handled by processor 420 or other processors on the satellite and they might or might not communicate. Program code storage 422 also may be used for storing temporary variables or other intermediate information during execution of instructions to be executed by processor 420. The program code might be replaceable in response to commands sent to the satellite. The program code, when stored in non-transitory storage media accessible to processor 420, might render the processing portion of the satellite into a special-purpose machine that is customized to perform the operations specified in the instructions. The memory components might be static or dynamic memory, preferably capable of operation in a space environment. A maintenance interface might be provided. Customized hard-wired logic, one or more application-specific integrated circuits (ASICs) or FPGAs, firmware and/or program logic which in combination with processor 420 to implement a special-purpose machine might be provided. Execution of sequences of instructions contained in program code storage 422 might cause processor 420 to perform process steps described in flowcharts and elsewhere herein. In alternative embodiments, hard-wired circuitry may be used in place of or in combination with software instructions. The term "storage media" as used herein can refer to any non-transitory media that store data and/or instructions that cause a machine to operation in a specific fashion. Such storage media may comprise non-volatile media and/or volatile media.

One aspect of the operation of processor 420 and/or the program code is to receive messages and transmit messages, to the ground and to other satellites so that as a system, the system delivers messages from sources to destinations. When the satellite receives a message on the uplink via ground antenna 412, the processor might determine, based on the location of the intended recipient having the destination device, what message path and thus which set of inter-satellite links to use for passing the message. Since the time it takes to move data through a satellite network is quite fast relative to the motion of the satellites around the Earth, the satellite that is above the recipient when the message was initiated at the source may well still have the destination device within its footprint when the message is finally delivered (or "terminated" in the telecommunications industry). Even if this is not the case, that fact can be calculated and anticipated as the data is delivered through the network. As a result, a satellite that is passing a message, or making a connection, determines whether or not the satellite that is to downlink the message to the recipient's destination device is in the same orbital plane as the uplink satellite. If it is not, the satellite that is passing the message transfers the message to another orbital plane in a cross-plane transfer. Once the message has arrived at a satellite that is in the orbital plane of the satellite that is to do the downlink (or terminate) the message, the signal can be passed the rest of the way through the forward links or aft links on the satellite until the message reaches the final destination satellite.

Each message can have a message path and a message's path can either be provided explicitly with the messages or can be determined by program steps executed on the satellite or elsewhere. However calculated, the message path follows an orbital plane until a suitable cross-plane transfer is available using the forward/aft antennas. The message path might be stored at a satellite and used to determine which antenna to use to retransmit and thus forward a message received.

Figure 5:
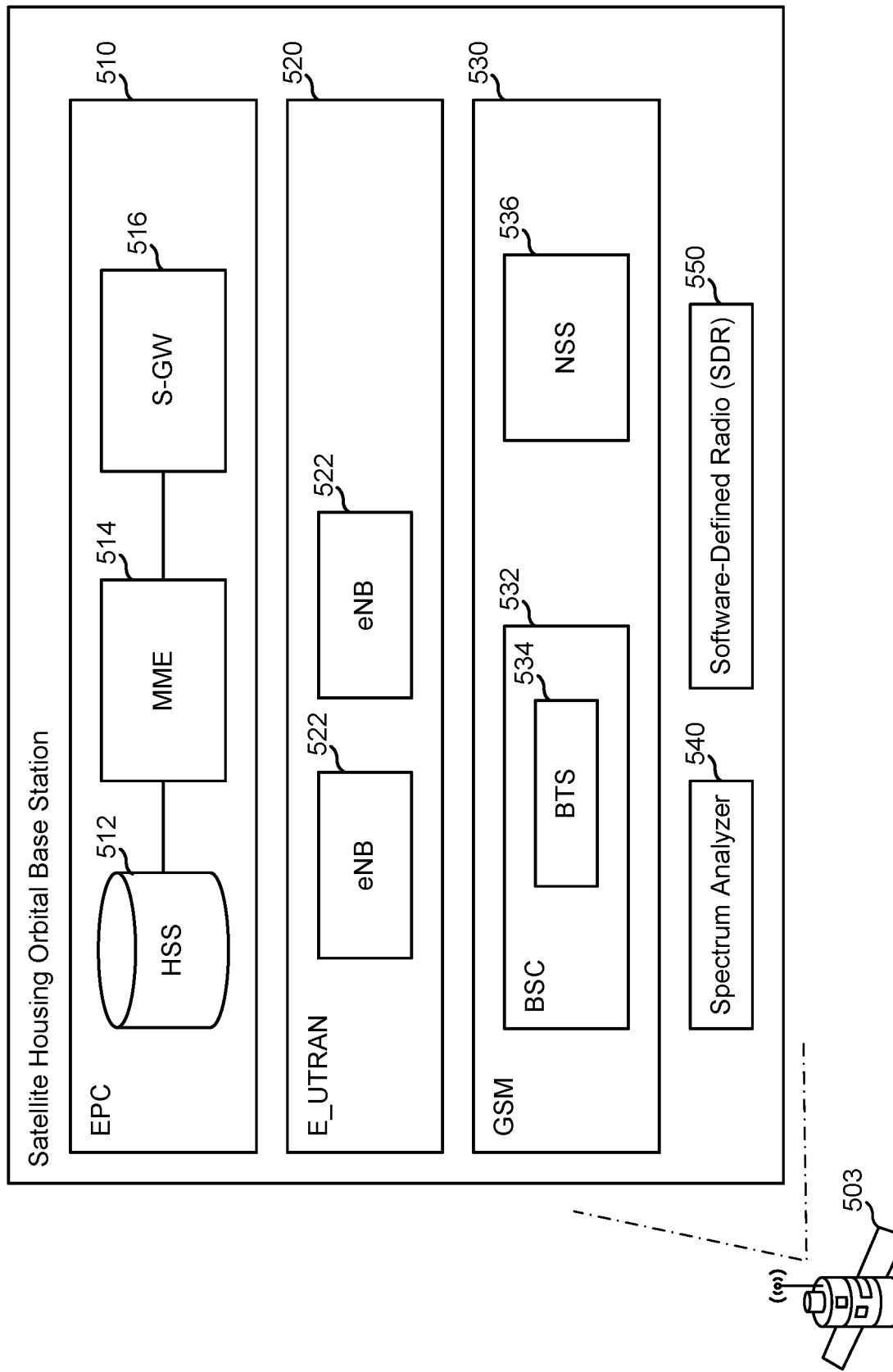
FIG. 5 is a block diagram of portions of a non-terrestrial base station according to various embodiments

FIG. 5 is a block diagram of portions of an orbital base station according to various embodiments, revealing the functional parts of an orbiting base station such as might be implemented on satellite 503 shown in FIG. 1. A similar set of elements might be used on a non-terrestrial base station that is not necessarily in orbit.

As shown there, an ePC unit 510 (an evolved Packet Core) comprises a home subscriber server (HSS) 512, a mobility management entity (MME) 514, and a serving gateway (S-GW) 516. The enhanced base station of FIG. 5 might be capable of both spectrum analysis and mobile network operation with multiple air interfaces, such as GSM and its Network Switching Subsystem (NSS) via an NSS unit 536, as well as an LTE (evolved UMTS terrestrial radio access network, or E_UTRAN) unit 502 comprising multiple eNBs 522. A software defined radio (SDR) 550 can be used by the higher levels of a protocol stack, including a spectrum analyzer 540 (which might be a spectrum analyzer module). Spectrum analyzer 540 might be used to measure the received signal strength over the frequency band of interest. In the example shown in FIG. 5, the orbital base station includes a global system for mobile communications (GSM) module 530, complete with BSC) 532, one or more BTSes 534, and optionally an NSS 536, with those elements and spectrum analyzer 540 working through SDR 550. A person of ordinary skill in the art will appreciate that other components or combinations of components may be used instead of or in addition to those listed for FIG. 5.

Figure 6:
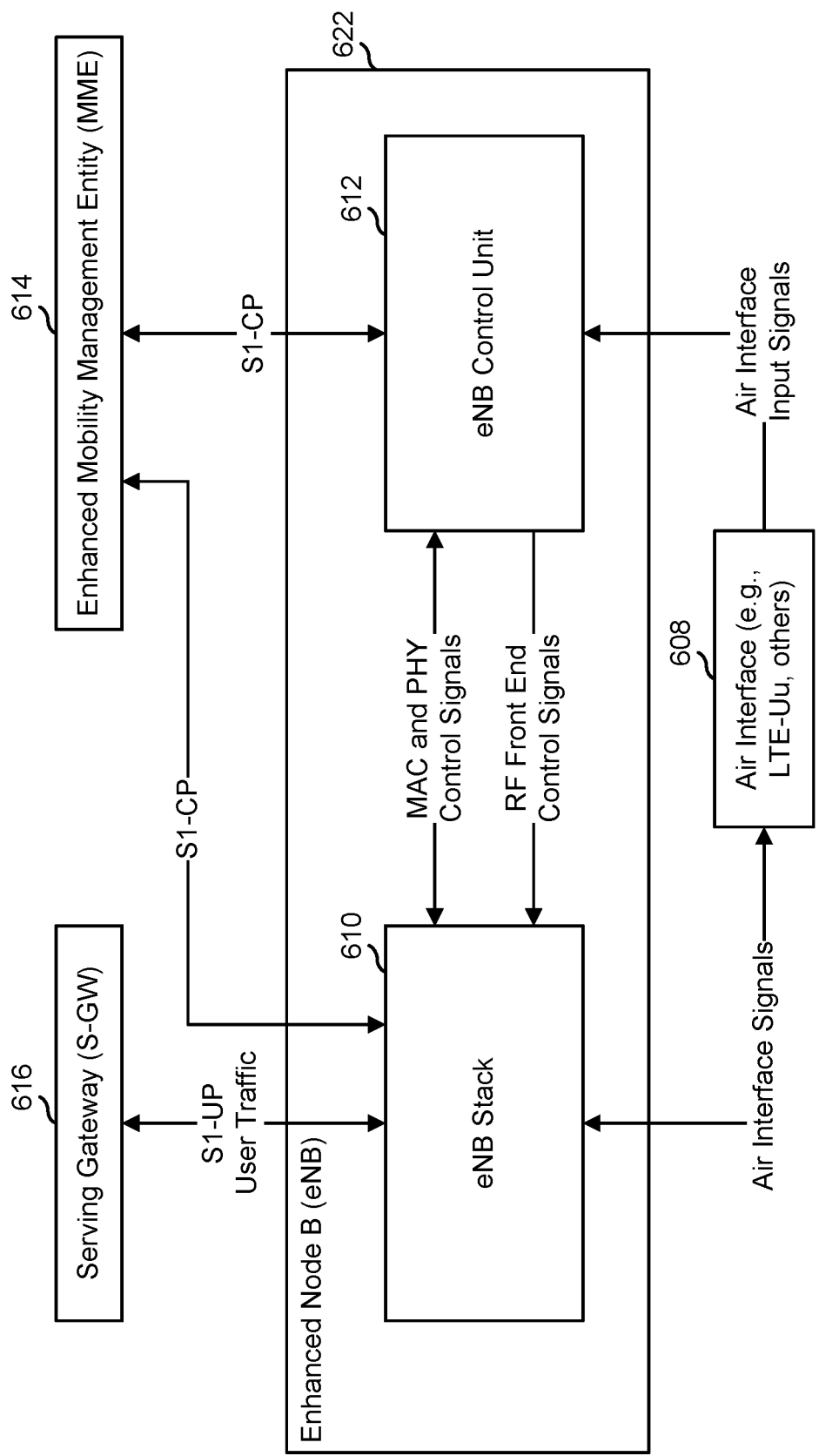
FIG. 6 is a block diagram of portions of a non-terrestrial base station according to various embodiments.

FIG. 6 is a block diagram of portions of a non-terrestrial base station according to various embodiments, as might be used for the non-terrestrial base stations described elsewhere herein, such as non-terrestrial base station 103 of FIG. 1 and might have some elements in common with FIG. 5. In the example shown in FIG. 6, the non-terrestrial base station includes a serving gateway (S-GW) 616 in two-way communication with an eNB stack 610 of an eNB 622, for example via an S1-UP protocol (S1 user plane, where S1 is an interface of long-term evolution (LTE), although other protocols may be used instead or in addition). eNB stack 610 can also be in two-way communication with the MME module 614, via an S1-CP (S1 control plane) protocol, and with an eNB control unit 612 via medium access control (MAC) and physical layer (PHY) control signals. eNB stack 610 can receive radio frequency front end control signals from eNB control unit 612. An air interface unit 608, which might for example be a Long-Term Evolution Physical Air Interface (LTE-Uu), can also be in two-way communication with eNB stack 610 via air interface (e.g., LTE-Uu) signals, and send air interface (e.g., LTE-Uu) input signals to eNB control unit 612. A person of ordinary skill in the art will appreciate that other components or combinations of components may be used instead of or in addition to those listed for FIG. 6.

Figure 7:
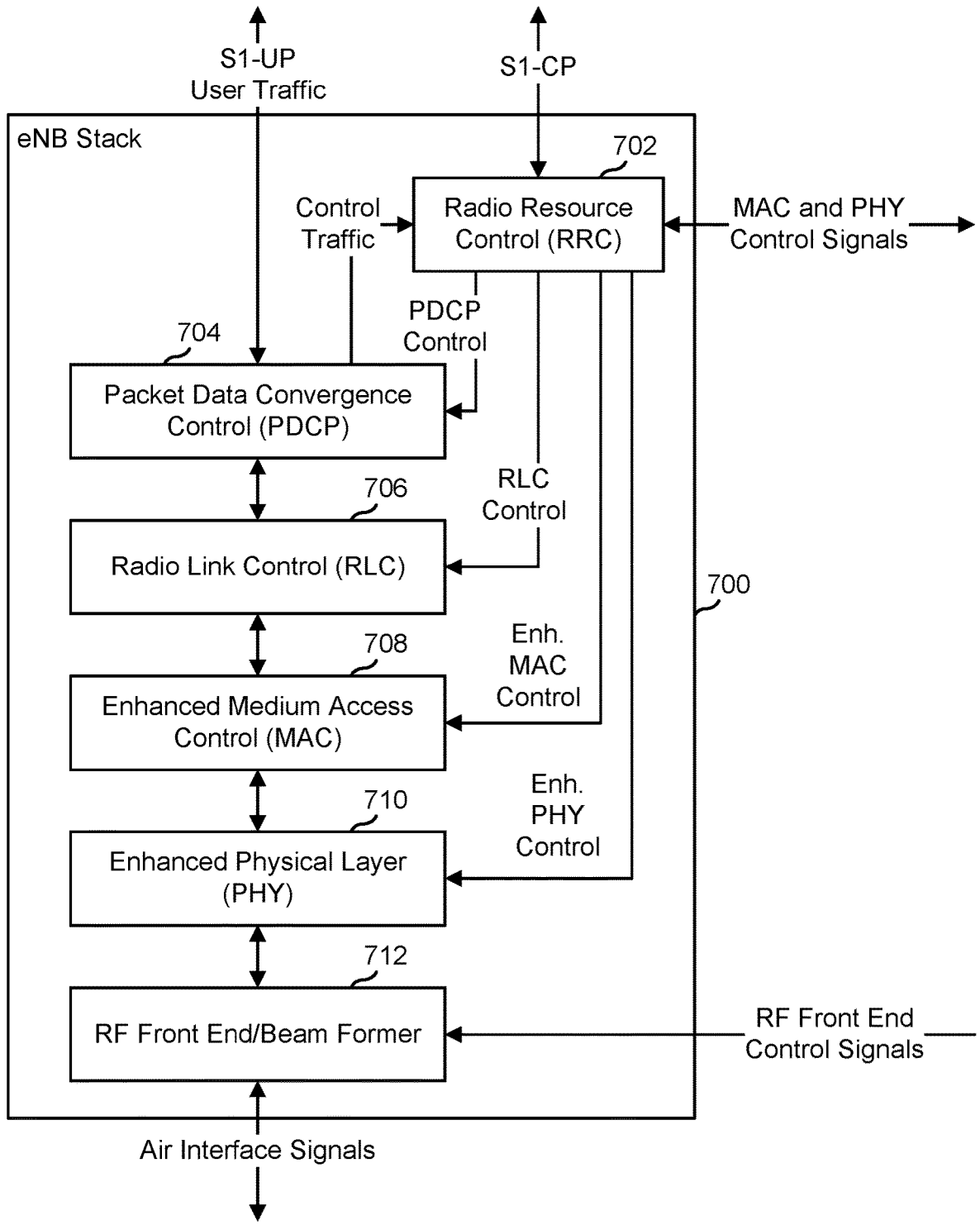
FIG. 7 is a block diagram of portions of a non-terrestrial base station according to various embodiments.

FIG. 7 is a block diagram of portions of an eNB stack 700 of a non-terrestrial base station according to various embodiments. In the example shown in FIG. 7, the non-terrestrial base station might be similar to eNB stack 610 shown in FIG. 6 and might include a radio resource control (RCC) module 702 that communicates outside of eNB stack 700, for example via an S1-CP protocol as described herein, and communicates with an eNB control unit via MAC and physical layer control signals.

In the example shown in FIG. 7, eNB stack 700 also includes a packet data convergence control (PDCP) module 704 that communicates outside stack 700 via S1-UP as described above. PDCP module 704 is in two-way communication with a radio link control (RLC) module, which is in two-way communication with an enhanced medium access control (MAC) module 708, which is in two-way communication with an enhances physical layer (PHY), which is in two-way communication with a radio frequency (RF) front end and/or beam former 712. In an example, radio frequency front end and/or beam former 712 receives RF front end control signals, and communicates outside eNB stack 700 via air interface (e.g., LTE-Uu) signals as described herein.

In an example, an RCC module 702 sends control signals to PDCP module 704, an RLC module 706, enhanced MAC module 708, and an enhanced physical layer (PHY) module 710. A person of ordinary skill in the art will appreciate that other components or arrangements of components may be used instead of or in addition to those shown in FIG. 7.

Spectrum Analysis

Figure 8:
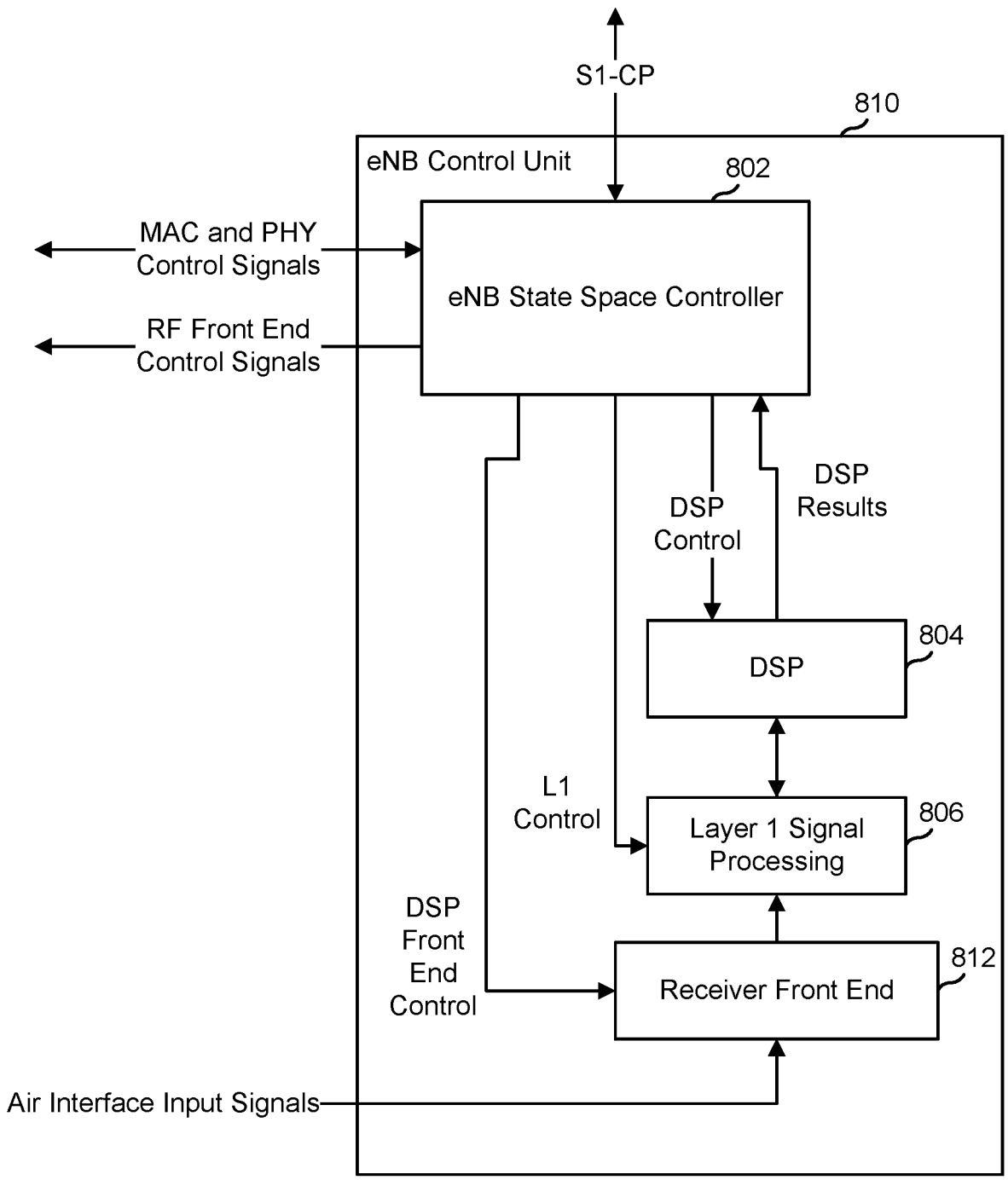
FIG. 8 is a block diagram of portions of a non-terrestrial base station according to various embodiments.

FIG. 8 is a block diagram of an eNB control unit 810 of a non-terrestrial base station according to various embodiments. In the example shown in FIG. 8, eNB control unit 810 might be similar to eNB control unit 612 shown in FIG. 6 and might include an eNB state space controller 802 that exchanges MAC and physical layer control signals with eNB stack 700 (see FIG. 7), and sends RF front end control signals to RF front end and/or beamformer 712 (see FIG. 7). The detection of terrestrial incapacity might involve the satellite's detection and analysis of the radio traffic on the ground using the radio of a base station transceiver, such as BTS 534 shown in FIG. 5, as a spectrum analyzer. This spectrum analysis capability on an enhanced base station as disclosed herein may, for example, comprise a digital signal processor (DSP) 804, a Layer 1 Signal Processing module 806, and a receiver front end 812. These components may be hardware, software, firmware, or combinations thereof, such as a field programmable gate array (FPGA) programmed to perform the functions described herein. In an example, DSP 804 receives control signals from, and returns processed signals to, an eNB state space controller 802, and is in two-way communication with Layer 1 Signal Processing module 806. Layer 1 signal processing module 806 receives control signals from eNB state space controller 802, and receives signals from receiver front end 812, which receives control signals from eNB state space controller 802 and air interface (e.g., LTE-Uu) signals from an air interface module such as air interface module 608 shown in FIG. 6.

Together, these elements can be configured to generate a data set that can be passed back to enhanced mobile management entity (MME) 514, shown in FIG. 5, through the base station to inform the interference table (such as those illustrated in FIGS. 9-13) for link budget calculations. Receiver front end 812 may be configurable to focus on particular bands of interest and may be similar to or equivalent to the front end used by the base station radio. The front end may be responsible for filtering and low noise amplification of signals across some resource blocks of interest. Layer 1 signal processing 806 may perform analog-to-digital (A/D) conversion and digital filtering of the signal. This may involve an FPGA, which can be reprogrammed or reconfigured by the base station state space controller.

The digitally filtered signals, which might be I and Q from RF samples, from Layer 1 signal processing may be passed back to DSP block 804 for further processing. If the spectrum analyzer front end (e.g., DSP block 804, Layer 1 signal processing 806, and receiver front end 812) can be used to digitally sample I and Q, with 16-bit resolution, from spectrum amounting to a 20 MHz block of spectrum, it may need to sample at a rate of at least twice the bandwidth, or higher (e.g., 40 MHz). Since the data does not necessarily need to be demodulated at some bit rate when doing spectrum analysis, the sampling rate could be reduced in some embodiments. At this rate, a 10-millisecond sample (e.g., 1 LTE radio time frame) of a 20 MHz LTE uplink block will generate 1.6 megabytes (MB) before any packet overhead or compression procedures. If left to sample continuously, the spectrum analyzer may generate data at a rate of 1.28 gigabits/s. This may or may not exceed the capability for the spacecraft to downlink raw data at a faster rate than it can sample, and record the data, before it fills up memory, data buffers, etc. As a result, particularly in early phases of the constellation deployment, digital signal processing and compression algorithms may be desired, or even needed, to manage the size of the spectrum analysis data, which may be facilitated by DSP block 804.

DSP block 804 may implement methods, and/or be programmed to, reduce the size of the data collected by doing a computation, or process, that generates some smaller sized numeric dataset to be used as actionable intelligence in the state space prediction engine. For instance, DSP block 804 may perform fast Fourier transforms (FFTs) across time slots on certain resource blocks and evaluate interference margins (in dB) above the expected noise floor on the 180 kHz resource block. The interference could be evaluated across time windows and resource blocks and time tagged so that it could be passed back as a matrix of numbers representing interference environments on certain frequency channels at certain times.

This information of radio signal strength at various frequencies of interest and may be stored in a database of historical spectrum analysis measurements, with the signal levels measured at recorded geographic locations, frequencies, and times, as suggested in FIGS. 9-13.

If current signal determinations fall below contracted terms, the satellite may be triggered to begin operation to replace the incapacitated terrestrial network constrained to the static polygons on the ground corresponding to the mobile network operator's contracted terms of service. Alternatively, if the orbital network management system (or components thereof) observes a substantial drop in power, relative to historical signal levels, accounting for daytime/nighttime weekend/weekday variations, then the satellite network may trigger such actions as; notifying the network operations center (NOC) of the likely incapacity of the network, notifying the relevant mobile network operators of the observed drop in radio signal strength in their terrestrial coverage region with a recommendation that the satellite network take over, or automatic replacement of the terrestrial network or continued operation of the satellite network. This list may not be exhaustive of the number of actions that may be triggered by these observed spectrum analysis measurements, and should be considered exemplary rather than limiting.

A person of ordinary skill in the art will appreciate that other components or arrangements of components may be used instead of or in addition to those shown in FIG. 8.

Figure 9:
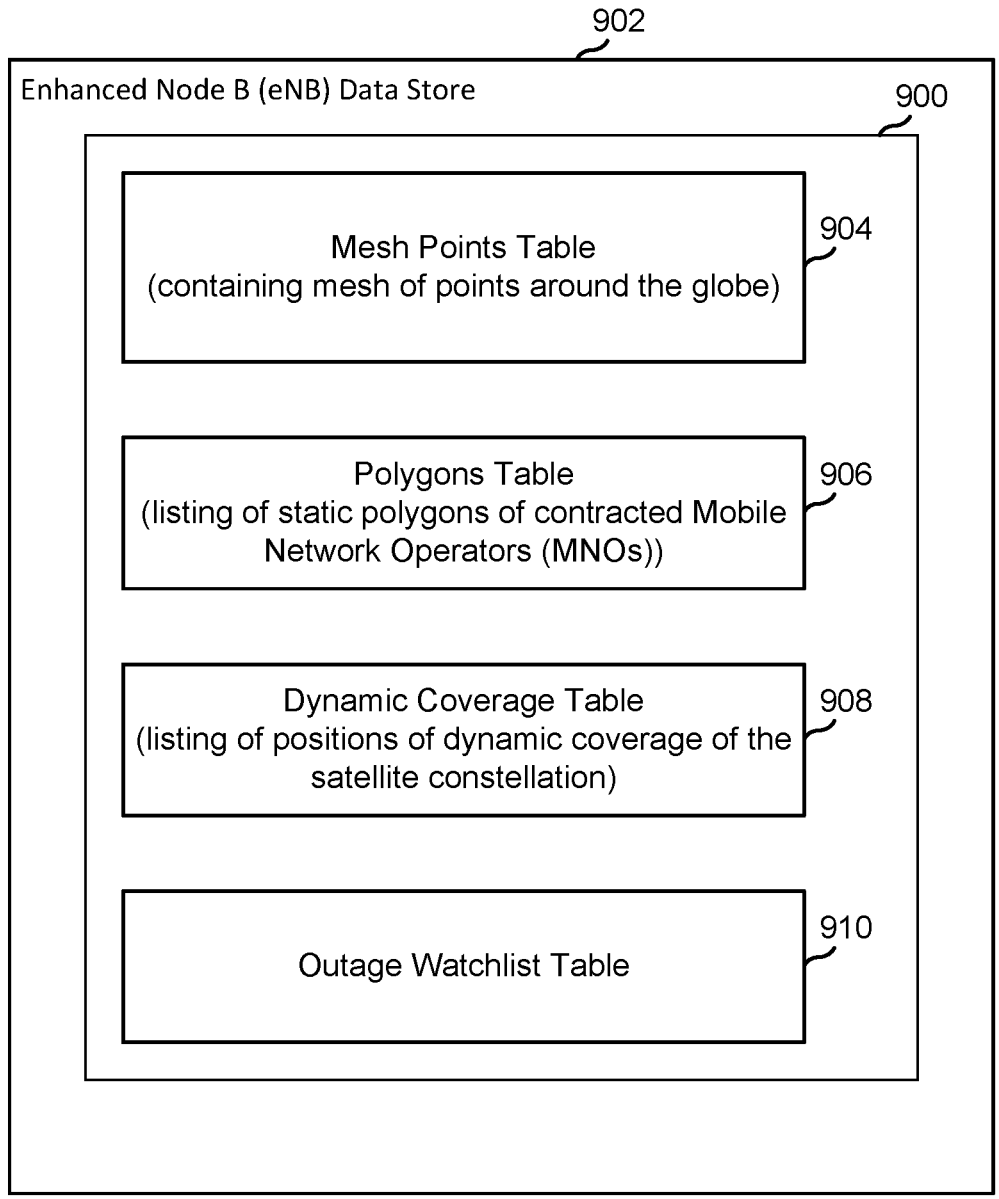
FIG. 9 is a block diagram of portions of an interference table according to various embodiments.

FIG. 9 is a block diagram of portions of an interference table 900 that may, for example, be stored in an enhanced eNB data store 902 associated with an eNB (such as an eNB 522 shown in FIG. 5) according to various embodiments. Data within interference table 900 can, for example, be used for calculations to determine whether a network outage has occurred, as well as the locations and/or severity of an outage. Depending on the implementation, interference table 900 may include a mesh points table 904, a polygons table 906, a dynamic coverage table 908, and an outage watchlist table 910, as described herein.

FIG. 10 illustrates an example of a mesh points table 1000, including the frequency, signal strength, measurement conditions, and other information regarding previously detected signals associated with a terrestrial wireless communication network according to various embodiments, as might be part of interference table 900 shown in FIG. 9. A processor may, for example, check this information against current or recent measurements to help determine if an expected signal is absent or degraded.

FIG. 11 illustrates an example of a polygons table 1100, which may, for example, include geographic information and other information about terrestrial base stations, ranges, or coverage areas associated with a particular terrestrial network according to various embodiments. Polygons table 1100 might be part of an interference table such as interference table 900 shown in FIG. 9.

A processor may use this information to determine whether a detected outage is associated with a partner terrestrial network (e.g., a terrestrial network that has contracted for backup satellite communication services). Such areas may be considered region of interest. For example, a negotiated agreement may exist with a given terrestrial network to provide coverage during outages. If the non-terrestrial base stations do not detect expected communications at all from such regions of interest, then the system may for example presume a total outage and may provide backup service. Detection of outage could for example include machine learning or other artificial intelligence techniques that recognize relevant parametric changes over time.

In some embodiments, machine learning techniques may also be used to examine historical trends in usage and combine disparate sources of data such as population density maps, detecting cellular broadcast messages sent from terrestrial cell towers alerting mobile phones for certain events that may render nearby terrestrial cell towers in a nearby region inoperable and/or incapacitated, and seasonal variations in usage and similar considerations of holidays to best recognize when a drop in spectrum usage might be due to such events as holidays rather than due to network incapacity. Such techniques such techniques may for example be referred to as artificial intelligence with machine learning based on statistical evaluations over many years.

FIG. 12 illustrates an example of a dynamic coverage table 1200 according to various embodiments. Dynamic coverage table 1200 might be part of an interference table such as interference table 900 shown in FIG. 9. Dynamic coverage table 1200 may, for example, store and continuously update information about the geographic area or footprint currently serviceable by one or more non-terrestrial base stations (e.g., one or more satellites in a satellite constellation) according to various embodiments. This information may for example be used to determine which non-terrestrial assets (e.g., which satellites or non-terrestrial base stations) are in position to provide services to the customers of a particular network that is currently experiencing an outage. In some cases, a non-terrestrial base station may be, or may be part of, an orbiting satellite. In other instances, a non-terrestrial base station may be carried on a balloon, aircraft, drone, projectile, or other non-terrestrial conveyance.

FIG. 13 illustrates an example of an outage watchlist table 1300. Outage watchlist table 1300 might be part of an interference table such as interference table 900 shown in FIG. 9. Outage watchlist table 1300 may store geographic information or other information about areas affected by natural disasters or other events that may result in outages for terrestrial networks according to various embodiments. Such areas may for example be considered regions of interest, and this information may for example be used to direct non-terrestrial assets to detect or analyze signals from the regions of interest in order to determine whether one or more network outages have in fact occurred. The outage watchlist table may for example include weather data (e.g., predicted hurricane), news, seismic events, war zones, evacuation zones, etc.

In an example NOC operators associated with a non-terrestrial communications network (e.g., a satellite constellation) may be on the watch for natural disasters and may observe if and when an orbital network management system determines terrestrial networks to be degraded/incapacitated. The NOC operators may then command the satellite base stations to check for a drop in levels from the terrestrial networks in the impacted areas and, so long as the terrestrial networks are observed (by the satellite alone) to be down, then the satellites may replace the incapacitated terrestrial networks of partner organizations in accordance with contracts or, if the MNO partners can be contacted during their incapacity, in accordance with direct requests or instructions.

Example Operation

Once a satellite, non-terrestrial base station, ground operations system, or other component of a space-based cellular network detects an incapacity on the part of a base station of a terrestrial cell tower, by analyzing spectra or otherwise, detecting activity or lack of activity of terrestrial cellular networks as an indicator for the operation or failure of the terrestrial network or otherwise, the space-based cellular network can restore some capacity. For example, a non-terrestrial base station might advertise availability to terminals in a geographic region within which terrestrial network service incapacity was detected and withdraw such advertisement when the terrestrial network service capacity appears to be restored.

The base station's radio might sense the power in the uplink band, looking for user equipment transmissions as a sign of terrestrial network operations. Alternatively, time division duplex (TDD) bands could be monitored for user equipment or base station transmissions. Finally, the satellite-based base station radio could be equipped with filter and switch capability to measure downlink terrestrial network frequencies, directly measuring the network's radio transmissions. This information can be used to trigger the satellite to fill-in missing terrestrial cellular service when needed and to stop providing the mobile satellite service when the terrestrial service resumes normal operation.

Examples of Incapacity Detection

The space-based spectrum analyzer might detect a network outage on the ground (e.g., a specific set of inoperative or incapacitated cell towers for a defined period of time). Based on these observations, a space-based cellular network might commence radio transmissions directed toward the region without usual operations in order to create a replacement for those incapacitated terrestrial cell towers.

When the terrestrial towers are ready to resume operation (e.g., the mobile network operator (MNO) sends technicians to fix the tower and power resumes), the spaced-based spectrum analyzer might detect an increase in terrestrial radio transmissions, and that might trigger the space-based cellular network to switch off the beam created for the incapacity.

An alternative method may be for the MNO to have an IoT device that will send an SMS to the spaced-based network letting it know the status of terrestrial cellular towers so that the base station on a satellite can become active when needed and inactive when not needed.

An alternative method may be for the MNO to use a network connection to the ground network portion of the space network, or to the space network directly. The network connection might be used to provide signals between the networks where the MNO terrestrial network could notify the space network of outages and take corrective action. In some embodiments, the space-based cellular network might identify where exactly to place new beams to re-optimize coverage deployment and bandwidth given the outages or incapacities. Additionally, the space network may notify the MNO terrestrial network when it is providing augmented coverage of incapacity that have been measured by spectrum analysis sensors on the satellites themselves.

An alternative method to determine if the previously incapacitated terrestrial network is restored to operation, is for the satellite's base station controller (BSC) to monitor, as it normally does, the measurement reports coming from the handset in the region of outage. In the normal operation of a mobile network such as GSM, the handset periodically measures the signal quality in nearby cells and at various frequency channels. These measurements are reported to the base station in the slow associated control channel (SACCH) every 480 milliseconds. These measurement reports are normally used to trigger mobile handovers when the connection to a new cell is better than the existing connection. In the case of a network resuming operation, the mobile phones may measure that the terrestrial network is measured as a stronger connection than that with the satellite and should originate a handover the terrestrial network. In such a situation, as the terrestrial network stabilizes, the mobile stations connected to the satellite shall be shed to the preferred terrestrial network as normal operations are resumed.

Once all the mobile stations are handed-off to the terrestrial network then the satellite may for example cease transmitting to the area, so as not to cause any radio interference with the terrestrial network that might be operating on the same frequency or adjacent frequencies to those used by the satellite.

Recognizing Changing Demand for Wireless Use

Traditionally, mobile operators may monitor call dropped rates to recognize regions where additional base stations and cell towers should be built. However, such a technique does not recognize isolated regions of emerging demand for unsatisfied wireless service. To address this problem, mobile operators also follow real estate transactions and general news for new housing construction, zoning for new amusement parks and even announcements of outdoor concerts and sports events that may draw crowds to areas that have limited or no existing mobile coverage.

The capabilities of the satellites disclosed herein, and the resulting ability to recognize and even connect to mobile phones that are not otherwise able to connect to the terrestrial networks, provides a way to measure the emergence of such regions and to provide mobile phone service through the satellite. If the capacity of the serving satellite(s) is trending to saturation, then the mobile operators might for example be alerted to the need to build additional terrestrial base stations to serve the unexpected growth in demand in that region.

Example Data Structures

Figure 14:
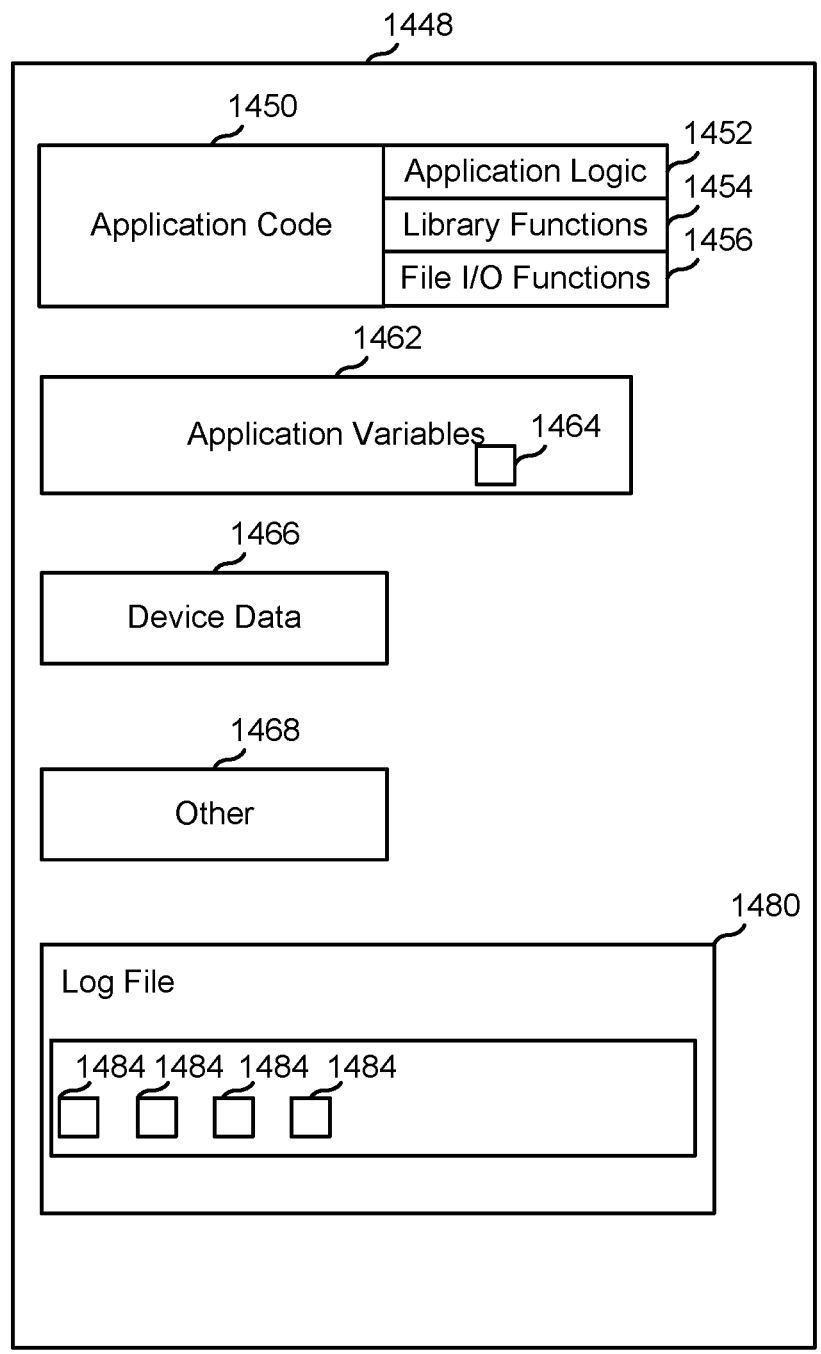
FIG. 14 illustrates an example computer system memory structure as might be used in performing methods described herein, according to various embodiments.

FIG. 14 illustrates an example of data structures that might be present in memory or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

FIG. 14 is a simplified functional block diagram of a storage device 1448 having an application that can be accessed and executed by a processor in a computer system as might be part of embodiments of a method and/or apparatus for providing backup network services in a communications network used by mobile terminals and/or a computer system that provides such backup network services. FIG. 14 also illustrates an example of memory elements that might be used by a processor to implement elements of the embodiments described herein. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network. For example, where a functional block is referenced, it might be implemented as program code stored in memory. The application can be one or more of the applications described herein, running on servers, clients or other platforms or devices and might represent memory of one of the clients and/or servers illustrated elsewhere.

Storage device 1448 can be one or more memory device that can be accessed by a processor and storage device 1448 can have stored thereon application code 1450 that can be configured to store one or more processor readable instructions, in the form of write-only memory and/or writable memory. The application code 1450 can include application logic 1452, library functions 1454, and file I/O functions 1456 associated with the application. The memory elements of FIG. 14 might be used for a server or computer that interfaces with a user, generates data, and/or manages other aspects of a process described herein.

Storage device 1448 can also include application variables 1462 that can include one or more storage locations configured to receive input variables 1464. The application variables 1462 can include variables that are generated by the application or otherwise local to the application. The application variables 1462 can be generated, for example, from data retrieved from an external source, such as a user or an external device or application. The processor can execute the application code 1450 to generate the application variables 1462 provided to storage device 1448. Application variables 1462 might include operational details needed to perform the functions described herein.

Storage device 1448 can include storage for databases and other data described herein. One or more memory locations can be configured to store device data 1466. Device data 1466 can include data that is sourced by an external source, such as a user or an external device. Device data 1466 can include, for example, records being passed between servers prior to being transmitted or after being received. Other data 1468 might also be supplied.

Storage device 1448 can also include a log file 1480 having one or more storage locations 1484 configured to store results of the application or inputs provided to the application. For example, the log file 1480 can be configured to store a history of actions, alerts, error message and the like.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hardwired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 15:
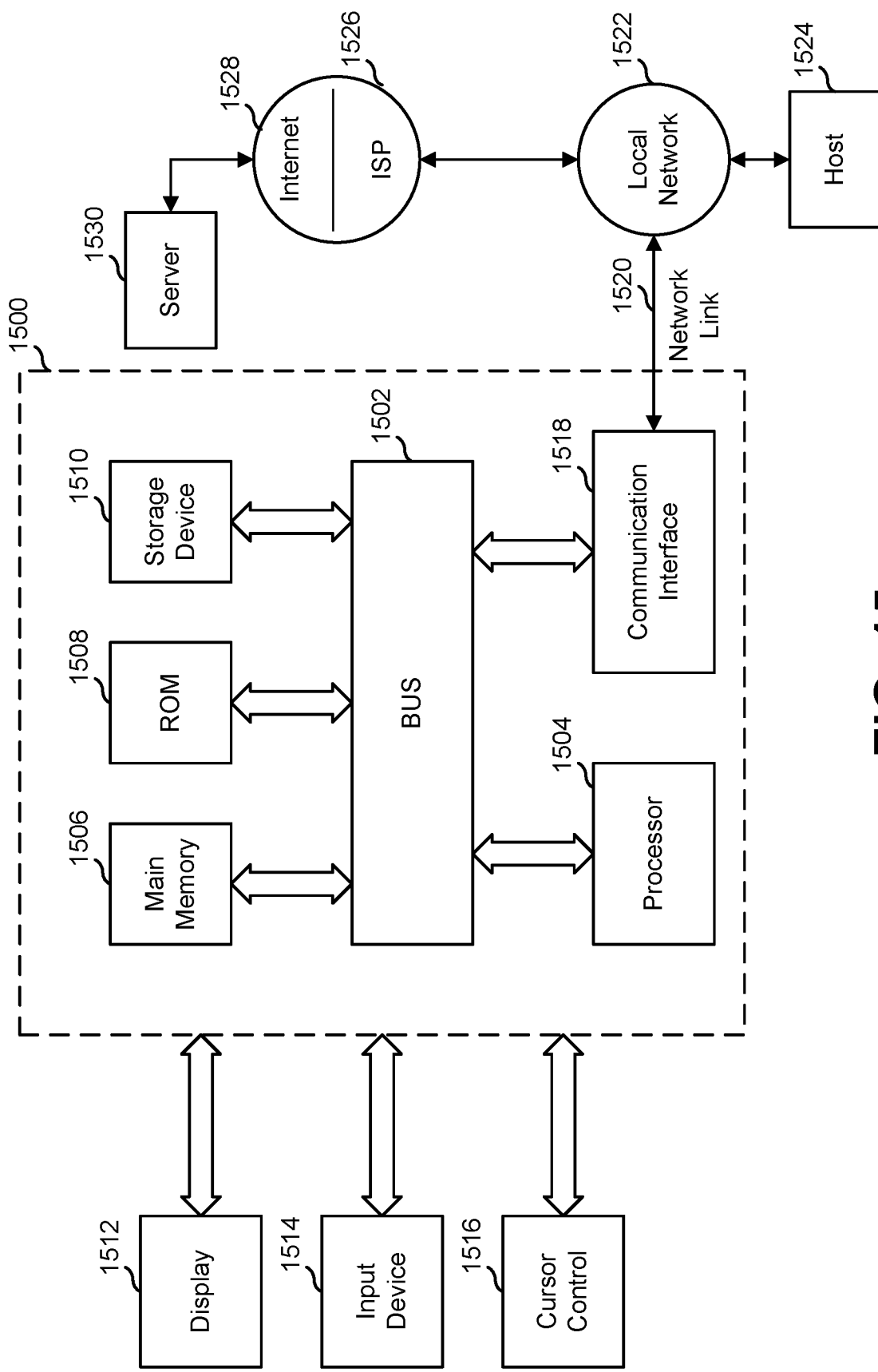
FIG. 15 is a block diagram illustrating an example computer system upon which the systems illustrated in FIGS. 1 and 14 may be implemented, according to various embodiments.

FIG. 15 is a block diagram that illustrates a computer system 1500 upon which the computer systems of the systems described herein and/or data structures shown in FIG. 14 may be implemented. Computer system 1500 includes a bus 1502 or other communication mechanism for communicating information, and a processor 1504 coupled with bus 1502 for processing information. Processor 1504 may be, for example, a general-purpose microprocessor.

Computer system 1500 also includes a main memory 1506, such as a random-access memory (RAM) or other dynamic storage device, coupled to bus 1502 for storing information and instructions to be executed by processor 1504. Main memory 1506 may also be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a computer monitor, for displaying information to a computer user. An input device 1514, including alphanumeric and other keys, is coupled to bus 1502 for communicating information and command selections to processor 1504. Another type of user input device is a cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a network connection. A modem or network interface local to computer system 1500 can receive the data. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be a network card, a modem, a cable modem, or a satellite modem to provide a data communication connection to a corresponding type of telephone line or communications line. Wireless links may also be implemented. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520, and communication interface 1518. In the Internet example, a server 1530 might transmit a requested code for an application program through the Internet 1528, ISP 1526, local network 1522, and communication interface 1518. The received code may be executed by processor 1504 as it is received, and/or stored in storage device 1510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium, e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for providing backup network services in a communications network used by mobile terminals, the method comprising:

receiving information regarding a terrestrial base station of the communications network;

using a first non-terrestrial base station and the information regarding the terrestrial base station, detecting an incapacity of the terrestrial base station;

identifying a second non-terrestrial base station within a communications range suitable to provide backup service to the communications network;

introducing the second non-terrestrial base station as a new base station of the communications network; and via the second non-terrestrial base station, for at least one mobile terminal of a plurality of mobile terminals capable of connecting to the terrestrial base station at least during other than a period of incapacitation of the terrestrial base station, carrying traffic between the at least one mobile terminal and the communications network.

2. The method of claim 1, wherein the first non-terrestrial base station and the second non-terrestrial base station are the same.

3. The method of claim 1, wherein the traffic comprises at least one of voice, text messaging, or data.

4. The method of claim 1, wherein detecting the incapacity is done, in part, at a ground station and, in part, at the first non-terrestrial base station.

5. The method of claim 1, wherein identifying the second non-terrestrial base station is based on a geographic location of the terrestrial base station and an orbital position of the second non-terrestrial base station.

6. The method of claim 1, wherein detecting the incapacity is done by analyzing signals within a spectrum used by the terrestrial base station.

7. The method of claim 6, wherein analyzing of signals is performed by the first non-terrestrial base station.

8. The method of claim 6, wherein analyzing of signals is performed by a ground station and results of the analyzing are communicated to the first non-terrestrial base station.

9. The method of claim 6, wherein detecting the incapacity is performed by detecting a cellular broadcast message sent from a terrestrial cell tower related to possible tower incapacitating events.

10. The method of claim 1, wherein the second non-terrestrial base station operates as a base station that appears to the at least one mobile terminal to be compatible with a communications protocol used between the at least one mobile terminal and the terrestrial base station.

11. The method of claim 1, further comprising advertising, to the plurality of mobile terminals capable of connecting to the terrestrial base station at least during other than the period of incapacitation of the terrestrial base station, an availability of the second non-terrestrial base station to carry traffic between mobile terminals of the plurality of mobile terminals and the communications network.

12. The method of claim 1, further comprising providing a spectrum analyzer capability in the first non-terrestrial base station, to be used to monitor spectrum occupancy of a terrestrial spectrum.

13. The method of claim 12, wherein detecting the incapacity of the terrestrial base station is done at least in part with the spectrum analyzer capability.

14. The method claim 12, wherein the spectrum analyzer capability employs physical components of the first non-terrestrial base station, but runs concurrently in software, so that the first non-terrestrial base station may be providing service in a first portion of its potential coverage area while monitoring spectrum usage in at least a second portion of its potential coverage area.

15. The method of claim 12, further comprising providing filter switches within the first or second non-terrestrial base station, to enable a radio of the first or second non-terrestrial base station to tune to and receive frequency bands used by the terrestrial base station.

16. The method claim 12, wherein introducing the second non-terrestrial base station as the new base station of the communications network comprises triggering the second non-terrestrial base station to begin operating at least partially within a spectrum vacated by an incapacitated terrestrial base station.

17. The method of claim 12, wherein introducing the second non-terrestrial base station as the new base station of the communications network comprises triggering the second non-terrestrial base station to begin operating at least partially within a geographic region vacated by incapacitated terrestrial base station.

18. The method of claim 12, further comprising:

displaying occupancy information to a human operator regarding changes in the monitored spectrum occupancy; and receiving authorization from the human operator to introduce the second non-terrestrial base station as the new base station of the communications network.

19. The method of claim 1, further comprising:

with the first or second non-terrestrial base station, detecting a resumed capacity of the terrestrial base station; and disconnecting the second non-terrestrial base station from the communications network.

20. A method for providing backup network services in a communications network used by mobile terminals, the method comprising:

from a device in communication with the communications network, receiving a first message comprising information regarding incapacity of a terrestrial base station of the communications network, or of a future event predicted to cause incapacity of the terrestrial base station;

based at least in part on the first message, identifying at least one non-terrestrial base station with predicted line of sight to the terrestrial base station or to at least a portion of a radio coverage region thereof;

introducing the at least one non-terrestrial base station as at least one new base station of the communications network;

via the at least one non-terrestrial base station, for at least one mobile terminal of a plurality of mobile terminals capable of connecting to the terrestrial base station at least during other than a period of incapacitation of the terrestrial base station, carrying traffic between the at least one mobile terminal and the communications network;

from the device in communication with the communications network, receiving a second message comprising information regarding a resumed capacity of the terrestrial base station; and based, at least in part, on the second message, disconnecting the at least one non-terrestrial base station from the communications network.

21. The method of claim 20, wherein the device is an Internet of things (IoT) device or the message is a simple messaging service (SMS) message.

* * * * *